(12) United States Patent
Tsutsui et al.

(10) Patent No.: US 9,789,677 B2
(45) Date of Patent: Oct. 17, 2017

(54) RECORDING MEDIUM, RECORDED MATTER, AND METHODS OF MANUFACTURING THE MEDIUM AND THE MATTER

(71) Applicant: CANON FINETECH INC., Misato-shi, Saitama-ken (JP)

(72) Inventors: Takahiro Tsutsui, Matsudo (JP); Yoichi Sonobe, Matsudo (JP); Masami Aruga, Misato (JP); Daizo Kitajo, Yoshikawa (JP); Hiroyuki Ishinaga, Tokyo (JP); Hiromitsu Hirabayashi, Yokohama (JP)

(73) Assignee: Canon Finetech Nisca Inc., Misato-shi (JP)

( * ) Notice: Subject to any disclaimer, the term of this patent is extended or adjusted under 35 U.S.C. 154(b) by 0 days.

(21) Appl. No.: 14/453,912

(22) Filed: Aug. 7, 2014

(65) Prior Publication Data

US 2015/0042737 A1    Feb. 12, 2015

(30) Foreign Application Priority Data

Aug. 9, 2013  (JP) ................ 2013-167123
Sep. 12, 2013  (JP) ................ 2013-189157

(Continued)

(51) Int. Cl.
*B32B 43/00*   (2006.01)
*B05D 5/04*    (2006.01)
(Continued)

(52) U.S. Cl.
CPC ............ *B32B 43/006* (2013.01); *B05D 3/007* (2013.01); *B05D 5/04* (2013.01); *B32B 37/025* (2013.01);

(Continued)

(58) Field of Classification Search
CPC .. B41M 5/5254; B41M 5/5218; B41M 5/502; B41M 5/508; B41M 3/12; B41M 2205/10
See application file for complete search history.

(56) References Cited

U.S. PATENT DOCUMENTS 5,193,007 A    3/1993  Yokoyama et al.
5,198,306 A *  3/1993  Kruse .................. B05D 7/04
                                                   347/105

(Continued)

FOREIGN PATENT DOCUMENTS

CN    1042510 A    5/1990
CN    1350930 A    5/2002

(Continued)

OTHER PUBLICATIONS

Mar. 31, 2015 European Search Report in European Patent Appln. No. 14180197.7.

(Continued)

*Primary Examiner* — Betelhem Shewareged
(74) *Attorney, Agent, or Firm* — Fitzpatrick, Cella, Harper & Scinto

(57) ABSTRACT

A recording medium, including: an ink-receiving layer configured to receive an ink for inkjet recording; and a transparent sheet having a total luminous transmittance of 50% or more, wherein the recoding medium has a layered structure in which the transparent sheet and the ink-receiving layer are sequentially stacked, and the ink-receiving layer includes a gap-absorption-type ink-receiving layer including a composition including at least inorganic fine particles and polyvinyl alcohol having a weight-average polymerization degree of 2,000 or more and 5,000 or less and a saponification degree of 70 mol % or more and 90 mol % or less.

20 Claims, 19 Drawing Sheets

(30) Foreign Application Priority Data

| Nov. 1, 2013 | (JP) | 2013-228643 |
|---|---|---|
| Nov. 1, 2013 | (JP) | 2013-228644 |
| May 16, 2014 | (JP) | 2014-102115 |

(51) Int. Cl.

| *B05D 3/00* | (2006.01) |
|---|---|
| *B32B 37/00* | (2006.01) |
| *B32B 37/06* | (2006.01) |
| *B32B 37/24* | (2006.01) |
| *B32B 38/00* | (2006.01) |
| *B41M 5/50* | (2006.01) |
| *B41M 5/52* | (2006.01) |
| *B41M 7/00* | (2006.01) |
| *B41M 3/12* | (2006.01) |

(52) U.S. Cl.
CPC .............. *B32B 37/06* (2013.01); *B32B 37/24* (2013.01); *B32B 38/004* (2013.01); *B41M 5/502* (2013.01); *B41M 5/508* (2013.01); *B41M 5/5254* (2013.01); *B41M 7/0027* (2013.01); *B32B 2037/243* (2013.01); *B32B 2329/04* (2013.01); *B32B 2554/00* (2013.01); *B41M 3/12* (2013.01); *B41M 5/5218* (2013.01); *B41M 2205/10* (2013.01)

(56) References Cited

U.S. PATENT DOCUMENTS

| 5,766,398 | A | * | 6/1998 | Cahill | B41M 5/0256 |
|---|---|---|---|---|---|
| | | | | | 156/240 |
| 5,919,559 | A | * | 7/1999 | Nakano | B41M 5/52 |
| | | | | | 428/32.24 |
| 6,007,182 | A | | 12/1999 | Matsubara et al. | |
| 6,062,674 | A | | 5/2000 | Inui et al. | |
| 6,164,772 | A | | 12/2000 | Koitabashi et al. | |
| 6,284,708 | B1 | | 9/2001 | Oshima et al. | |
| 6,399,674 | B1 | | 6/2002 | Kashiwazaki et al. | |
| 6,403,198 | B1 | | 6/2002 | Urasaki | |
| 6,474,807 | B1 | | 11/2002 | Honda | |
| 6,652,929 | B2 | | 11/2003 | Moriya et al. | |
| 6,663,237 | B2 | | 12/2003 | Ishinaga et al. | |
| 6,670,037 | B1 | | 12/2003 | Okura et al. | |
| 8,314,175 | B2 | | 11/2012 | Takahashi et al. | |
| 8,778,467 | B2 | | 7/2014 | Asao et al. | |
| 2002/0015827 | A1 | * | 2/2002 | Fujii | B41M 5/508 |
| | | | | | 428/32.18 |
| 2005/0074601 | A1 | | 4/2005 | Onishi | |
| 2006/0172094 | A1 | | 8/2006 | Shi et al. | |
| 2008/0241436 | A1 | | 10/2008 | Kobayashi | |
| 2010/0033522 | A1 | * | 2/2010 | Saito | C09D 11/54 |
| | | | | | 347/9 |
| 2013/0011584 | A1 | | 1/2013 | Asao et al. | |

FOREIGN PATENT DOCUMENTS

| CN | 101128325 A | 2/2008 |
|---|---|---|
| CN | 101626902 A | 1/2010 |
| EP | 0 649 753 A1 | 4/1995 |
| GB | 2 410 705 A | 8/2005 |
| JP | 56-120508 A | 9/1981 |
| JP | 60-168651 A | 9/1985 |
| JP | 62-009988 A | 1/1987 |
| JP | 62-238791 A | 10/1987 |
| JP | H04-201595 A | 7/1992 |
| JP | H06-072015 A | 3/1994 |
| JP | H09-503168 A | 3/1997 |
| JP | H10-217599 A | 8/1998 |
| JP | 2000-211246 A | 8/2000 |
| JP | 2000-238439 A | 9/2000 |
| JP | 2000-255157 A | 9/2000 |
| JP | 2000-255160 A | 9/2000 |
| JP | 2000-318302 A | 11/2000 |
| JP | 2002-370347 A | 12/2002 |
| JP | 2003-211761 A | 7/2003 |
| JP | 2003-285542 A | 10/2003 |
| JP | 2004-001446 A | 1/2004 |
| JP | 2004-035796 A | 2/2004 |
| JP | 2004-243641 A | 9/2004 |
| JP | 2004-306450 A | 11/2004 |
| JP | 2004-345315 A | 12/2004 |
| JP | 2006-249123 A | 9/2006 |
| JP | 2007-261029 A | 10/2007 |
| JP | 2008-018645 A | 1/2008 |
| JP | 2008-044130 A | 2/2008 |
| JP | 2008-188865 A | 8/2008 |
| JP | 2008-246764 A | 10/2008 |
| JP | 2008-246791 A | 10/2008 |
| JP | 2009-297930 A | 12/2009 |
| JP | 2010-221475 A | 10/2010 |
| JP | 2011-179290 A | 9/2011 |
| JP | 2011-218580 A | 11/2011 |
| JP | 2012-224741 A | 11/2012 |
| JP | 2013-032004 A | 2/2013 |

OTHER PUBLICATIONS

Jul. 28, 2015 European Search Report in European Patent Appln. No. 14180197.7.

Feb. 14, 2017 Japanese Official Action in Japanese Patent Appln. No. 2016-077270.

Feb. 21, 2017 Chinese Official Action in Chinese Patent Appln. No. 201410389685.3.

\* cited by examiner

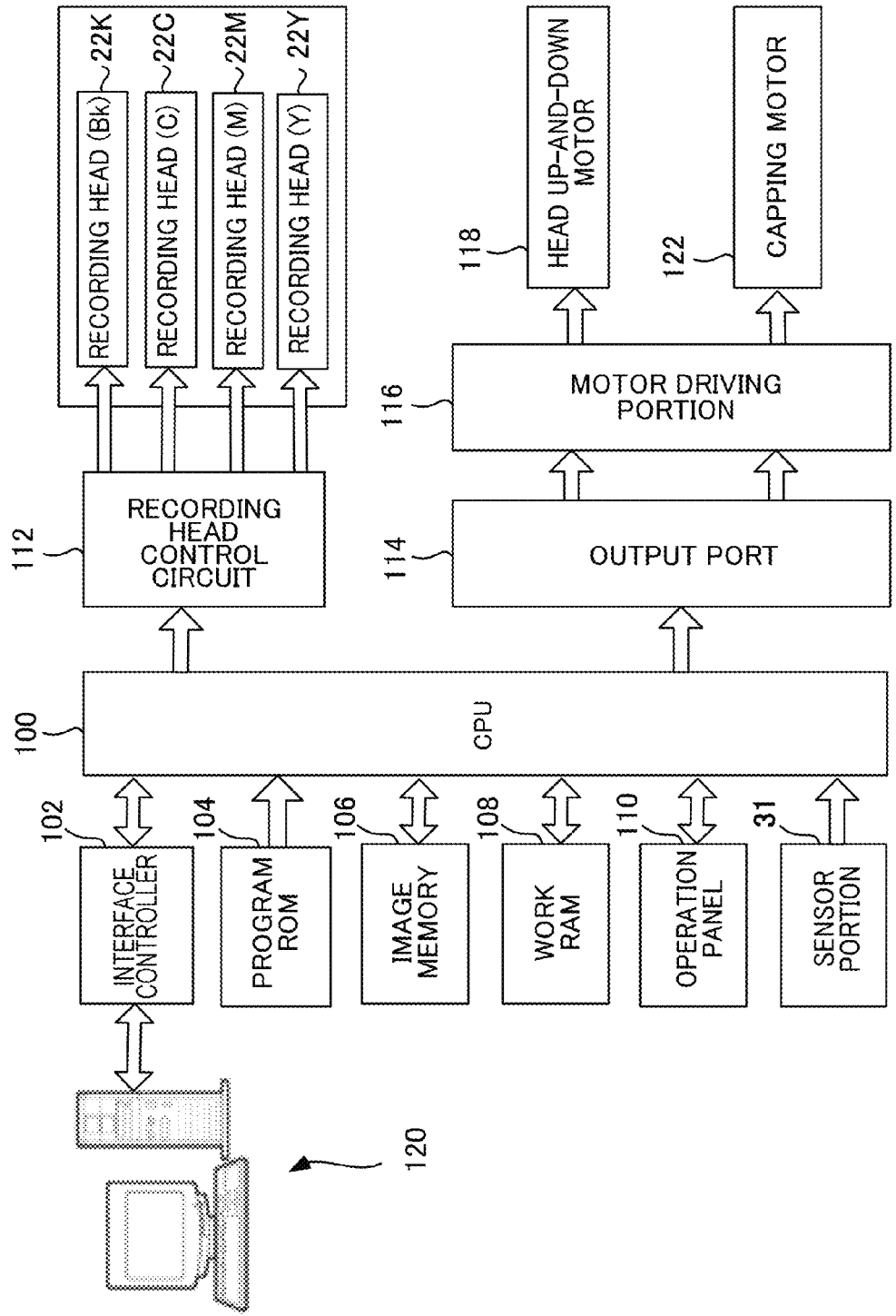

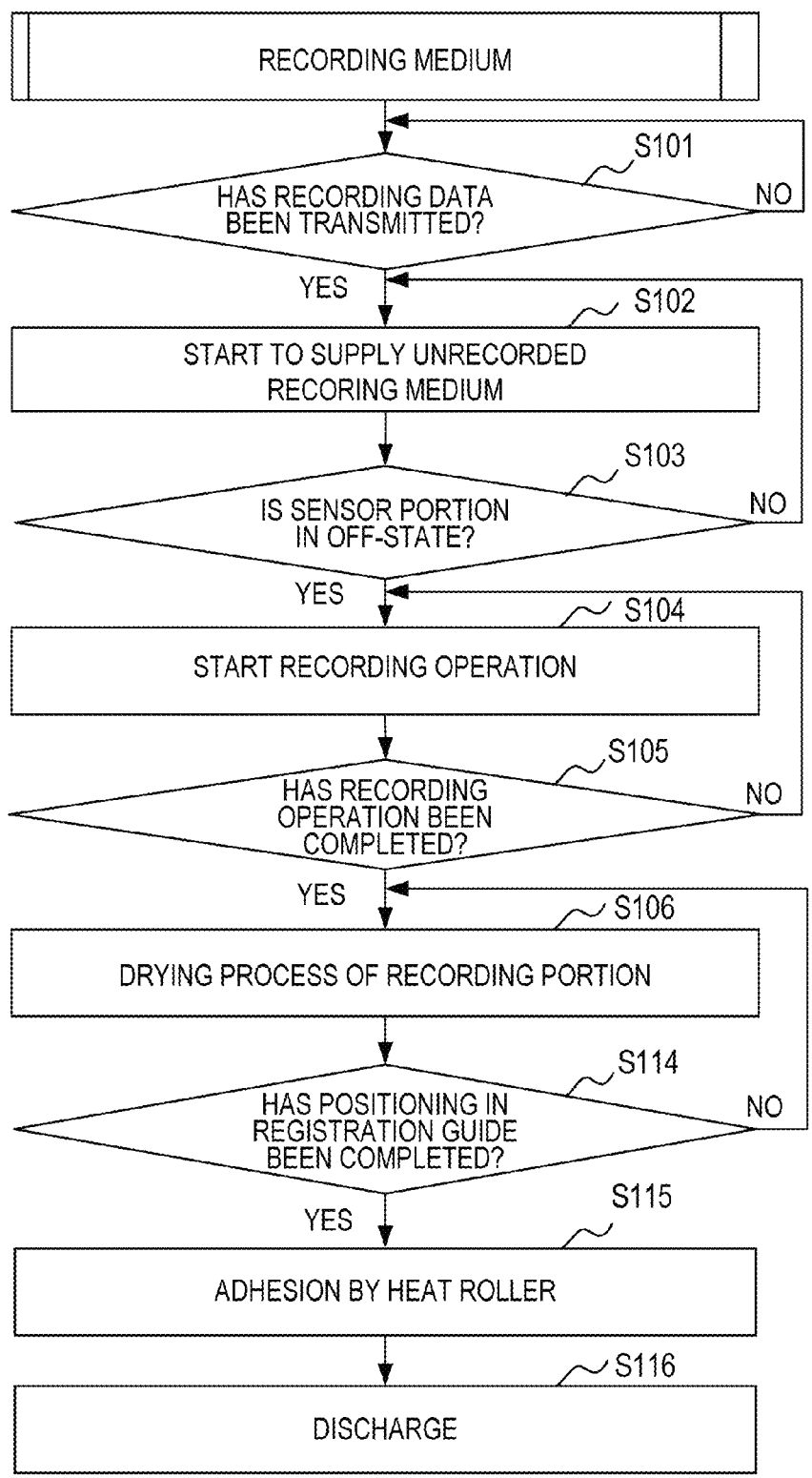

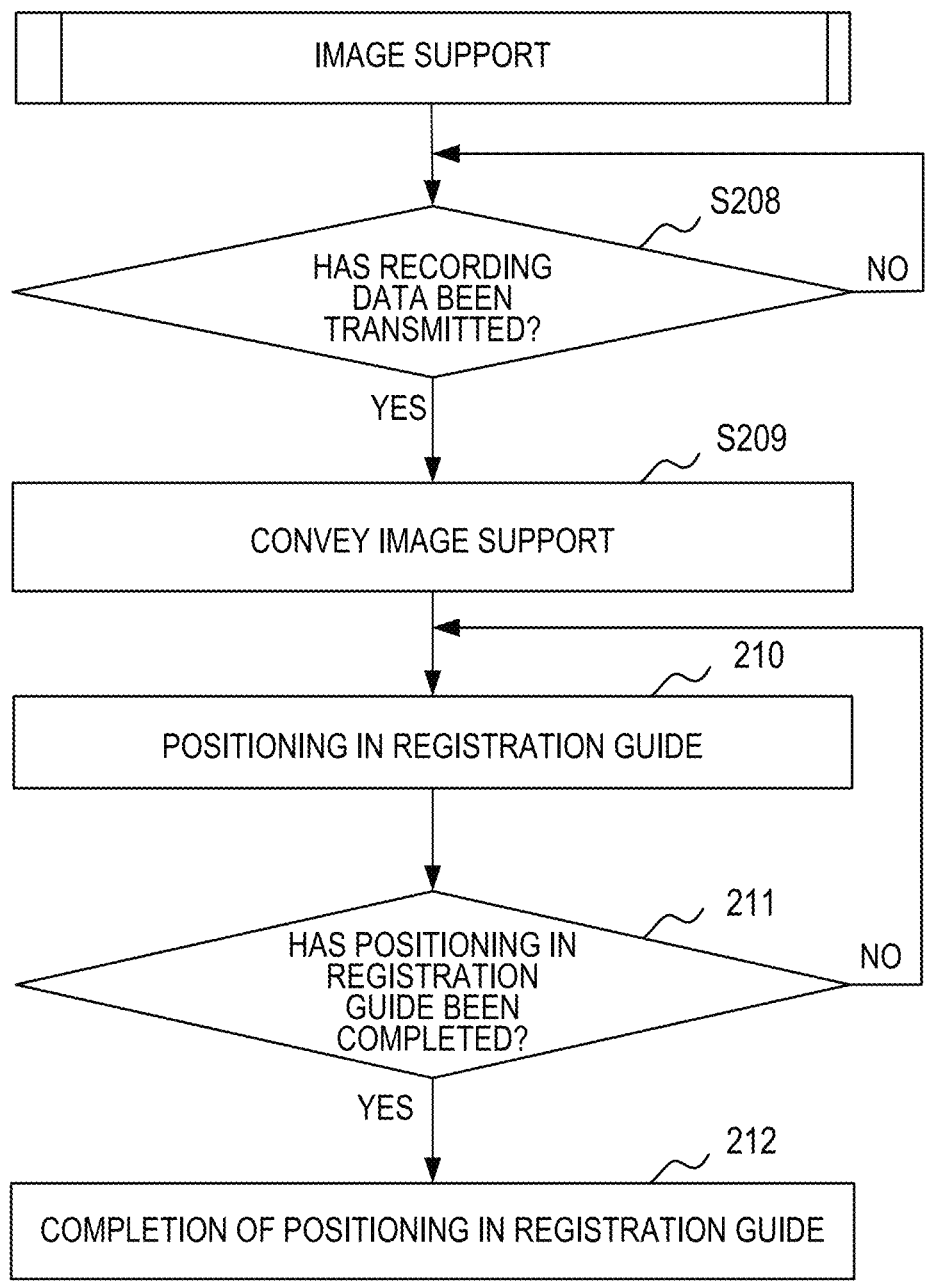

RECORDING MEDIUM, RECORDED MATTER, AND METHODS OF MANUFACTURING THE MEDIUM AND THE MATTER

BACKGROUND OF THE INVENTION

Field of the Invention

The present invention relates to a recording medium including an ink-receiving layer, in particular, a recording medium in which a reverse image (mirror image) is recorded on an ink-receiving layer, and to a method of manufacturing the recording medium. In addition, the present invention relates to a recorded matter including a recording medium and an image support, the image support supporting an original image (normal image), and to a method of manufacturing the recorded matter.

Description of the Related Art

Various thermal transfer recording methods have heretofore been known. Of those, the following thermal transfer method is generally used (Japanese Patent Application Laid-Open No. 62-238791). An image is formed by heating a thermal transfer sheet, the sheet having formed on its base material sheet a colored transfer layer, from its back surface with a thermal head or the like according to the shape of the image to thermally transfer the colored transfer layer onto the surface of a thermal transfer image-receiving sheet. The thermal transfer method has been expanding its market as a full-color hard copy system for digital images typified by computer graphics, still images provided by satellite communications, CD-ROMs, and the like, and analog images such as a video because of the development of various kinds of hardware and software related to multimedia.

When recorded matters are obtained by forming images on any of various objects such as paper, a resin product, and a metal, the images have heretofore been formed on the objects by thermal transfer systems. The thermal transfer systems are roughly classified into a sublimation transfer type and a thermal fusion transfer type depending on the construction of the colored transfer layer. Each of both systems can form a full-color image, and involves: preparing thermal transfer sheets for three to four colors such as yellow, magenta, and cyan colors, and as required, a black color; and superimposing and thermally transferring respective color images onto the surface of the same thermal transfer image-receiving sheet to form the full-color image.

For example, the following recorded-matter-manufacturing-method has been proposed as a recorded-matter-manufacturing-method of manufacturing a recorded matter involving employing a thermal fusion transfer-type thermal transfer system (Japanese Patent Application Laid-Open No. 2000-238439). A recording medium in which a receiving layer is provided on a base material in a releasable manner, and a thermal transfer sheet having a dye layer are used, an image is formed by transferring the dye of the dye layer onto the receiving layer on the base material, and then the recorded matter is manufactured by heating the recording medium to transfer the receiving layer onto an object.

A recorded-matter-manufacturing-method involving forming an image with a sublimation-transfer-type thermal transfer sheet has also been proposed (Japanese Patent Application Laid-Open No. 2003-211761).

The sublimation-transfer-type thermal transfer sheet enables precise formation of a gray-scale image such as a face photograph. On the other hand, the image has the following inconvenience unlike an image formed by using an ordinary recording ink. The image is deficient in durability such as weatherability, abrasion resistance, or chemical resistance. The following has been performed as a solution to the inconvenience (Japanese Patent Application Laid-Open No. 2008-44130). A protective layer thermal transfer film having a thermally transferable resin layer is superimposed on a thermal transfer image, and the thermally transferable resin layer having transparency is transferred by a thermal head, a heating roll, or the like to form a protective layer on the image.

A technology involving printing an image on the receiving layer of a recording medium by an inkjet system, superimposing the recording medium and a transfer member, and heating the resultant to transfer the image has also been proposed (Japanese Patent Application Laid-Open No. 2008-188865).

However, such printing method as described in Japanese Patent Application Laid-Open No. 2008-44130 has involved a major problem in terms of productivity because of the following reason. An image transfer region is provided on a thermal transfer film for each color in the order "black-→cyan→magenta→yellow→transparent protective layer," and the image is formed by sequentially transferring the respective colors while sequentially repeating the forward and backward movements of the transfer member, and hence the productivity of the image is hard to improve. In addition, a major problem in terms of information security has been left in the thermal transfer recording method. Specifically, recorded information remains as a negative on the thermal transfer film and hence special consideration is needed for the disposal of the thermal transfer film after its use. Further, such method has involved a major problem in terms of economical efficiency because a thermal transfer film corresponding to the entirety of a recording surface is needed irrespective of an image and the ratio of a recording cost related to a non-recording portion is large.

In addition, the technology described in Japanese Patent Application Laid-Open No. 2008-188865 has no specific description concerning a recording medium. Accordingly, it has been unable to manufacture a recording medium suitable for the technology in which the inkjet system is employed, the recording medium and the transfer member are superimposed, and the image is transferred by heating the resultant.

SUMMARY OF THE INVENTION

The present invention has been made to solve the problems. That is, according to one embodiment of the present invention, there is provided a recording medium configured to achieve an improvement in productivity of a recorded matter, an improvement in information security thereof, and a reduction in recording cost therefor. According to another embodiment of the present invention, there is provided a recording medium adapted for an inkjet system.

The inventors of the present invention have made extensive studies on the problems. As a result, the inventors have conceived that the productivity of a recorded matter can be drastically improved and a recording cost therefor can be reduced by adopting an inkjet recording system instead of a thermal transfer recording system, and its information security can be improved by the adoption because no negative remains. Further, the inventors have conceived that a recording medium adapted for the inkjet system can be constituted by precisely controlling the construction of, for example, an inorganic fine particle or water-soluble resin in an ink-receiving layer, and have completed the present invention. That is, according to the present invention, there are provided the following recording medium, recorded matter, and methods of manufacturing the recording medium and the recording matter.

[1] Recording Medium:

According to one embodiment of the present invention, there is provided a recording medium, comprising: an ink-receiving layer configured to receive an ink for inkjet recording; and a transparent sheet having a total luminous transmittance of 50% or more, wherein the recording medium has a layered structure in which the transparent sheet and the ink-receiving layer are sequentially stacked, and the ink-receiving layer includes a gap-absorption-type ink-receiving layer comprising a composition including at least inorganic fine particles and polyvinyl alcohol having a weight-average polymerization degree of 2,000 or more and 5,000 or less and a saponification degree of 70 mol % or more and 90 mol % or less.

Further, according to another embodiment of the present invention, there is provided a recording medium, comprising: an ink-receiving layer configured to receive an ink for inkjet recording; and a transparent sheet having a total luminous transmittance of 50% or more, wherein the recording medium has a layered structure in which the transparent sheet and the ink-receiving layer are sequentially stacked, and the ink-receiving layer includes a gap-absorption-type ink-receiving layer comprising a composition including at least alumina fine particles having an average particle diameter of 120 nm or more and 200 nm or less and at least one kind of resin selected from the group consisting of a water-soluble resin and a water-dispersible resin.

[2] Recorded Matter:

Further, according to still another embodiment of the present invention, there is provided a recorded matter, comprising: an image support on which an image is supported; and the above-mentioned recording medium on which the image is recorded, wherein the recorded matter has a layered structure in which the image support, the ink-receiving layer, and the transparent sheet are sequentially stacked.

[3] Method of Manufacturing Recording Medium:

Further, according to still another embodiment of the present invention, there is provided a method of manufacturing a recording medium comprising an ink-receiving layer configured to receive an ink for inkjet recording and a transparent sheet having a total luminous transmittance of 50% or more, the recording medium having a layered structure in which the transparent sheet and the ink-receiving layer are sequentially stacked, the method comprising: applying, to a surface of the transparent sheet, a coating liquid including at least water, inorganic fine particles and polyvinyl alcohol having a weight-average polymerization degree of 2,000 or more and 5,000 or less, and a saponification degree of 70 mol % or more and 90 mol % or less; and forming a gap-absorption-type ink-receiving layer comprising a composition including at least the inorganic fine particles and the polyvinyl alcohol.

Further, according to still another embodiment of the present invention, there is provided a method of manufacturing a recording medium comprising an ink-receiving layer configured to receive an ink for inkjet recording and a transparent sheet having a total luminous transmittance of 50% or more, the recording medium having a layered structure in which the transparent sheet and the ink-receiving layer are sequentially stacked, the method comprising: applying, to a surface of the transparent sheet, a coating liquid including at least water, alumina fine particles having an average particle diameter of 120 nm or more and 200 nm or less, and at least one kind of resin selected from the group consisting of a water-soluble resin and a water-dispersible resin; and forming a gap-absorption-type ink-receiving layer comprising a composition including at least the alumina fine particles and the resin.

[4] Method of Manufacturing Recorded Matter:

Further, according to still another embodiment of the present invention, there is provided a method of manufacturing a recorded matter comprising an image support on which an image is supported and a recording medium on which the image is recorded, the method comprising: obtaining the recording medium by the method of manufacturing a recording medium according to the present invention; and thermally pressure-bonding the image support and the recording medium in a state of being brought into abutment so that the image support, the ink-receiving layer, and the transparent sheet are sequentially stacked to obtain a recorded matter having a layered structure in which the image support, the ink-receiving layer, and the transparent sheet are sequentially stacked.

Further features of the present invention will become apparent from the following description of exemplary embodiments with reference to the attached drawings.

BRIEF DESCRIPTION OF THE DRAWINGS

FIG. 9 is a block diagram illustrating the construction of the control system of a recording portion illustrated in FIG. 8.

FIGS. 10A and 10B are flowcharts illustrating the operation flow of the first manufacturing apparatus.

FIGS. 17A and 17B are flowcharts illustrating the operation flow of the second manufacturing apparatus.

DESCRIPTION OF THE EMBODIMENTS

Figure 1:
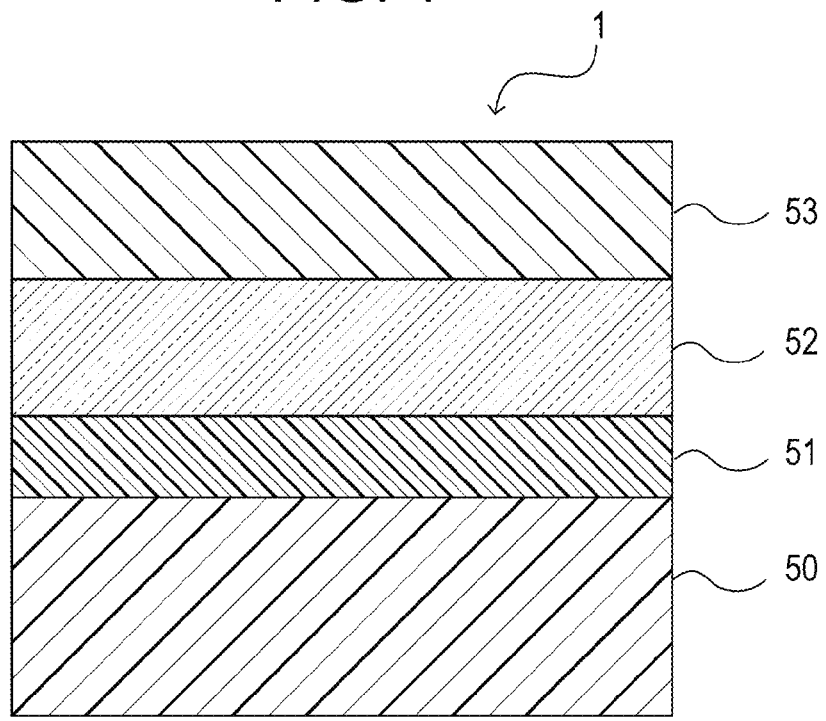
FIG. 1 is a view illustrating an embodiment of a recording medium of the present invention, the view being a cross-sectional view schematically illustrating a cross-section obtained by cutting the recording medium in its thickness direction.

Hereinafter, the present invention is described in detail with reference to the drawings. However, the present invention is not limited to the following embodiments and comprehends all objects having matters specifying the invention. It should be noted that members of the same structure are denoted by the same reference symbol in the drawings and description thereof may be omitted.

In the present invention, an inkjet recording system is adopted instead of a thermal transfer recording system. Thus, an improvement in productivity of a recorded matter, an improvement in information security thereof, and a reduction in recording cost therefor can be achieved as compared with the thermal transfer system.

In a first embodiment of the present invention, the weight-average polymerization degree and saponification degree of polyvinyl alcohol constituting an ink-receiving layer are precisely controlled. Thus, an adhesive strength between the ink-receiving layer and a transparent sheet as a problem inherent in the case where the inkjet system is adopted can be increased.

In a second embodiment of the present invention, the average particle diameter of alumina fine particles constituting the ink-receiving layer is precisely controlled. Thus, the transparency (permeability) of the ink-receiving layer as a problem inherent in the case where the inkjet system is adopted can be improved, and the visibility of a reverse image from the transparent sheet side can be improved. Therefore, even when a pigment ink that hardly permeates the ink-receiving layer is used, there is no need to increase the thickness of the ink-receiving layer for increasing an ink density or causing the layer to receive a large amount of the ink. Accordingly, not only the thickness of a recording medium but also the entire thickness of a recorded matter can be reduced.

[1] Recording Medium:

FIG. 1 is a view illustrating an embodiment of a recording medium of the present invention, the view being a cross-sectional view schematically illustrating a cross-section obtained by cutting the recording medium in its thickness direction. The recording medium of the present invention is a recording medium comprising an ink-receiving layer 53 and a transparent sheet 52 like a recording medium 1 illustrated in FIG. 1.

[1-1] Ink-Receiving Layer:

The ink-receiving layer is a layer configured to receive an ink for inkjet recording. The types of the ink-receiving layer include a swelling-absorption-type which receives the ink in a mesh structure of a water-soluble polymer and a gap-absorption-type which receives the ink in gaps (microporous) formed by inorganic fine particles. The recording medium of the present invention includes a gap-absorption-type ink-receiving layer comprising a composition containing at least inorganic fine particles, and at least one kind of resin selected from the group consisting of a water-soluble resin and a water-dispersible resin. The gap-absorption-type ink-receiving layer can quickly absorb the ink by virtue of gaps formed by the inorganic fine particles. Therefore, the frequency of abrupt bumping of the ink upon pressure bonding of the recording medium onto an image support under heat is reduced, and hence such inconvenience that the recording medium and the image support do not closely adhere to each other in a complete manner (poor adhesiveness), and such inconvenience that air bubbles (air pockets) remain between the recording medium and the image support (air bubble remaining) can be suppressed.

[1-1-1] Inorganic Fine Particles:

The inorganic fine particles are fine particles formed of an inorganic material. The inorganic fine particles have a function of forming gaps configured to receive the ink in the ink-receiving layer.

The kind of the inorganic material constituting the inorganic fine particles is not particularly limited. However, an inorganic material having a high ink-absorbing ability, excellent in color developability, and capable of forming a high-quality image is preferred. Examples thereof can include calcium carbonate, magnesium carbonate, kaolin, clay, talc, hydrotalcite, aluminum silicate, calcium silicate, magnesium silicate, diatomaceous earth, alumina, colloidal alumina, aluminum hydroxide, a hydrated alumina having a boehmite structure, a hydrated alumina having a pseudo-boehmite structure, lithopone (a mixture of barium sulfate and zinc sulfate), and zeolite.

Of the inorganic fine particles formed of those inorganic materials, alumina fine particles formed of at least one kind of substance selected from the group consisting of alumina and a hydrated alumina are preferred. Examples of the hydrated alumina can include a hydrated alumina having a boehmite structure and a hydrated alumina having a pseudo-boehmite structure. Alumina, the hydrated alumina having a boehmite structure, or the hydrated alumina having a pseudoboehmite structure is preferred because any such material can improve the transparency of the ink-receiving layer and the recording density of an image.

The hydrated alumina having a boehmite structure can be obtained by adding an acid to a long-chain aluminum alkoxide to perform hydrolysis and peptization (see Japanese Patent Application Laid-Open No. S56-120508). Any one of an organic acid and an inorganic acid may be used in the peptization. However, nitric acid is preferably used. The use of nitric acid can improve the reaction efficiency of the hydrolysis, can provide a hydrated alumina having a controlled shape, and can provide a dispersion liquid having good dispersibility.

The average particle diameter of the inorganic fine particles is preferably 120 nm or more and 200 nm or less. Setting the average particle diameter to 120 nm or more, preferably 140 nm or more can improve the ink absorbability of the ink-receiving layer, and hence can suppress the exudation or beading of the ink in an image after its recording. Meanwhile, setting the average particle diameter to 200 nm or less, preferably 170 nm or less can suppress light scattering due to the inorganic fine particles, and hence can improve the glossiness and transparency of the ink-receiving layer. In addition, the setting can increase the number of the inorganic fine particles per unit area of the ink-receiving layer, and hence can improve the ink absorbability. Therefore, the setting can increase the recording density of the image and can suppress the lack of luster of the image after the recording.

Commercially available inorganic fine particles may be used as they are as the inorganic fine particles, or the commercially available inorganic fine particles whose average particle diameter and polydispersity index have been adjusted with a pulverization dispersing machine or the like may be used. The kind of the pulverization dispersing machine is not particularly limited. For example, a conventionally known pulverization dispersing machine such as a high-pressure homogenizer, an ultrasonic homogenizer, a wet media-type pulverizer (a sand mill or a ball mill), a continuous high-speed stirring-type dispersing machine, or an ultrasonic dispersing machine can be used.

More specific examples of the pulverization dispersing machine can include: Manton-Gaulin homogenizer and Sonolator (each of which is manufactured by Doyei Shoji Co., Ltd.); Microfluidizer (manufactured by MIZUHO INDUSTRIAL CO., LTD.); Nanomizer (manufactured by Tsukishima Kikai Co., Ltd.); Ultimaizer (manufactured by ITOCHU MACHINE-TECHNOS CORPORATION); PEARL MILL, GRAIN MILL, and TORNADO (each of which is manufactured by ASADA IRON WORKS CO., LTD.); Visco Mill (manufactured by AIMEX CO., Ltd.); MIGHTY MILL, RS MILL, and SI MILL (each of which is manufactured by INOUE MFG., INC.); Ebara Milder (manufactured by EBARA CORPORATION); and FINE FLOW MILL and CAVITRON (each of which is manufactured by Pacific Machinery & Engineering Co., Ltd.), all of which are trade names.

In addition, the inorganic fine particles preferably satisfy the range of the average particle diameter and have a polydispersity index ($\mu/<\Gamma>^2$) of 0.01 or more and 0.20 or less, and the inorganic fine particles more preferably have a polydispersity index of 0.01 or more and 0.18 or less. Setting the index within the range can keep the sizes of the particles constant, and hence can improve the glossiness and transparency of the ink-receiving layer. Therefore, the setting can increase the recording density of an image and can suppress the lack of luster of the image after its recording.

It should be noted that the average particle diameter and polydispersity index as used herein can be determined by analyzing values measured by a dynamic light scattering method by a cumulant method described in the "Structure of Polymer, (2) Scattering Experiment and Morphological Observation, Chapter 1 Light Scattering" (KYORITSU SHUPPAN CO., LTD., edited by The Society of Polymer Science, Japan) or J. Chem. Phys., 70(B), 15 Apl., 3965 (1979). According to the theory of dynamic light scattering, when fine particles having different particle diameters are mixed, the attenuation of a time correlation function from scattered light has a distribution. The average ($<\Gamma>$) and variance ($\mu$) of an attenuation rate are determined by analyzing the time correlation function by the cumulant method. The attenuation rate ($\Gamma$) is represented by a function of the diffusion coefficients and scattering vectors of the particles, and hence their hydrodynamic average particle diameter can be determined by using Stokes-Einstein's equation. Therefore, the polydispersity index ($\mu/<\Gamma>^2$) obtained by dividing the variance ($\mu$) of the attenuation rate by the square of its average ($<\Gamma>^2$) represents the extent to which the particle diameters vary, and means that the distribution of the particle diameters narrows as a value for the index approaches 0. The average particle diameter and polydispersity index defined in the present invention can be easily measured with, for example, a laser particle diameter analyzer PARIII (manufactured by Otsuka Electronics Co., Ltd.).

One kind of inorganic fine particles can be used alone, or two or more kinds thereof can be used as a mixture. The term "two or more kinds" comprehends inorganic fine particles different from each other in material itself, and inorganic fine particles different from each other in characteristics such as an average particle diameter and a polydispersity index.

[1-1-2] Water-Soluble Resin, Water-Dispersible Resin:

The water-soluble resin is a resin that completely mixes with water, or has a solubility in water of 1 (g/100 g) or more, at 25° C. The water-dispersible resin is a resin serving as a constituent component of latex. The water-soluble resin or the water-dispersible resin functions as a binder for binding the inorganic fine particles.

Examples of the water-soluble resin can include: starch, gelatin, casein, and modified products thereof; a cellulose derivative such as methylcellulose, carboxymethylcellulose, or hydroxyethylcellulose; polyvinyl alcohol (e.g., completely saponified, partially saponified, or low saponified polyvinyl alcohol) or modified products thereof (e.g., a cationically modified product, an anionically modified product, and a silanol-modified product); and resins such as a urea-based resin, a melamine-based resin, an epoxy-based resin, an epichlorohydrin-based resin, a polyurethane-based resin, a polyethylene imine-based resin, a polyamide-based resin, a polyvinylpyrrolidone-based resin, a polyvinyl butyral-based resin, poly(meth)acrylic acid or a copolymer resin thereof, an acrylamide-based resin, a maleic anhydride-based copolymer resin, and a polyester-based resin.

Examples of the water-dispersible resin can include: a synthetic rubber such as SBR or NBR; an acrylic polymer resin such as a methyl methacrylate-butadiene copolymer resin or an acrylate copolymer resin; a vinyl-based polymer resin such as an ethylene-vinyl acetate copolymer resin; and a functional group-modified polymer resin obtained by introducing a cationic group or anionic group into the synthetic rubber or the polymer resin. The water-dispersible resin may be present in a state of latex whose dispersion medium is water.

Of the water-soluble resins and the water-dispersible resins, polyvinyl alcohol, in particular, saponified polyvinyl alcohol obtained by hydrolyzing (saponifying) polyvinyl acetate is preferred.

In the recording medium of the present invention, the ink-receiving layer is preferably formed of a composition containing polyvinyl alcohol having a saponification degree of 70 mol % or more and 100 mol % or less. The saponification degree means the percentage of the number of moles of the hydroxyl groups of the polyvinyl alcohol to the total number of moles of the acetic acid groups and hydroxyl groups thereof.

Setting the saponification degree to 70 mol % or more, preferably 86 mol % or more prevents the ink-receiving layer from becoming excessively hard and can impart sufficient viscoelasticity to the ink-receiving layer. Therefore, the setting can increase an adhesive strength between the transparent sheet and the ink-receiving layer, and hence can suppress such inconvenience that the ink-receiving layer peels from the transparent sheet owing to the insufficiency of the adhesive strength. In addition, the setting can reduce the viscosity of a coating liquid containing the inorganic fine particles and the polyvinyl alcohol. Therefore, the setting facilitates the application of the coating liquid to the transparent sheet and hence can improve the productivity of the recording medium. Meanwhile, setting the saponification degree to 100 mol % or less, preferably 90 mol % or less can impart moderate hydrophilicity to the ink-receiving layer and hence improves the absorbability of the ink. Therefore, the setting enables the recording of a high-quality image on the ink-receiving layer.

As the saponified polyvinyl alcohol that satisfies the range of the saponification degree, there can be given, for example, completely saponified polyvinyl alcohol (saponification degree: 98 mol % or more and 99 mol % or less), partially saponified polyvinyl alcohol (saponification degree: 87 mol % or more and 89 mol % or less), and low saponified polyvinyl alcohol (saponification degree: 78 mol % or more and 82 mol % or less). Of those, partially saponified polyvinyl alcohol is preferred.

In the recording medium of the present invention, the ink-receiving layer is preferably formed of a composition containing polyvinyl alcohol having a weight-average polymerization degree of 2,000 or more and 5,000 or less.

Setting the weight-average polymerization degree to 2,000 or more, preferably 3,000 or more provides the polyvinyl alcohol with a moderate viscosity and can impart sufficient viscoelasticity to the ink-receiving layer. Therefore, the setting can increase the adhesive strength between the transparent sheet and the ink-receiving layer, and hence can suppress such inconvenience that the ink-receiving layer peels from the transparent sheet owing to the insufficiency of the adhesive strength. Meanwhile, setting the weight-average polymerization degree to 5,000 or less, preferably 4,500 or less can reduce the viscosity of a coating liquid containing the inorganic fine particles and the polyvinyl alcohol. Therefore, the setting facilitates the application of the coating liquid to the transparent sheet and hence can improve the productivity of the recording medium. In addition, the setting prevents the pores of the ink-receiving layer from being filled and can keep good open states of the pores, and hence improves the absorbability of the ink. Therefore, the setting enables the recording of a high-quality image on the ink-receiving layer.

A value for the weight-average polymerization degree is a value calculated in conformity with a method described in JIS-K-6726.

One kind of the water-soluble resin and the water-dispersible resin can be used alone, or two or more kinds thereof can be used as a mixture. The term "two or more kinds" comprehends resins different from each other in characteristics such as a saponification degree and a weight-average polymerization degree.

The amount of the water-soluble resin or the water-dispersible resin is preferably set to 3.3 parts by mass or more and 100 parts by mass or less with respect to 100 parts by mass of the inorganic fine particles. Setting the amount of the water-soluble resin or the water-dispersible resin to 3.3 parts by mass or more, preferably 5 parts by mass or more inhibits the occurrence of the cracking or powder dropping of the ink-receiving layer. Meanwhile, setting the amount of the water-soluble resin or the water-dispersible resin to 100 parts by mass or less, preferably 33 parts by mass or less improves the absorbability of the ink.

[1-1-3] Thickness:

The thickness of the ink-receiving layer is not particularly limited. However, the thickness of the ink-receiving layer is preferably 10 μm or more and 20 μm or less. Setting the thickness of the ink-receiving layer to 10 μm or more, preferably 13 μm or more, more preferably 18 μm or more can secure the absorbability of the ink and the transparency of the ink-receiving layer. In addition, the setting improves the absorbability of the ink and the fixability of the ink. Meanwhile, setting the thickness of the ink-receiving layer to 20 μm or less can improve the transparency of the ink-receiving layer. In addition, the setting is preferred because the setting facilitates the suppression of the thickness of an entire recorded matter to a total thickness of 0.84 mm or less described in JIS 6301 when a plastic card is used as an image support as described later.

[1-1-4] Others:

The ink-receiving layer may have an auxiliary image different from a reverse image to be described later formed (preprinted) thereon in advance.

[1-2] Transparent Sheet:

The transparent sheet means a sheet having a total luminous transmittance measured in conformity with JIS K7375 of 50% or more, preferably 90% or more. Therefore, not only a colorless and transparent sheet but also, for example, a semitransparent sheet and a colored transparent sheet are included in the category of the transparent sheet.

The kind of the transparent sheet is not particularly limited. However, a sheet, film, or the like formed of a material excellent in durability such as weatherability, abrasion resistance, or chemical resistance is preferred. The sheet can be, for example, a resin film.

As a resin constituting the resin film, there can be given, for example: polyester such as polymethyl methacrylate, polyethylene terephthalate (PET), 1,4-polycyclohexylenedimethylene terephthalate, or polyethylene naphthalate; polyamide/polyimide such as nylon (aliphatic polyamide), aramid (aromatic polyamide), or polyimide; a cellulose derivative such as cellophane, cellulose acetate, or polyacetate; and a resin such as polyethylene, polypropylene, polystyrene, polyphenylene sulfide, polysulfone, polycarbonate, polyvinyl alcohol, polyvinyl chloride, an ionomer, or polylactic acid. Of those, a thermoplastic resin is preferred, and more specifically, PET excellent in weatherability is preferred. One kind of the resin films formed of those resins can be used alone, or two or more kinds thereof can be used in a composite or stacked manner.

The thickness of the transparent sheet has only to be appropriately determined in consideration of a material strength and the like, and is not particularly limited. However, the thickness of the transparent sheet is preferably 0.5 µm or more and 100 µm or less. Setting the thickness of the transparent sheet to 0.5 µm or more, preferably 1 µm or more can provide a weatherability-imparting effect. Meanwhile, setting the thickness of the transparent sheet to 100 µm or less, preferably 10 µm or less, more preferably 5 µm or less can improve thermal transference when the recording medium is pressure-bonded onto an image support under heat.

The recording medium of the present invention includes the transparent sheet 52 like the recording medium 1 illustrated in FIG. 1. The recording medium 1 includes the transparent sheet 52, and hence when the medium is pressure-bonded onto an image support under heat, a reverse image recorded on the ink-receiving layer 53 can be viewed as an original image through the transparent sheet 52. In addition, when the recording medium 1 is pressure-bonded onto the image support under heat, the transparent sheet 52 functions as a protective layer for the reverse image recorded on the ink-receiving layer 53.

When a dye ink is used as an ink for recording the reverse image on the ink-receiving layer (ink for inkjet recording), the transparent sheet preferably contains a UV-cutting agent in order that the decomposition (photo-deterioration) of the dye due to UV light may be prevented. Examples of the UV-cutting agent can include: UV absorbers such as a benzotriazole-based compound and a benzophenone-based compound; and UV-scattering agents such as titanium oxide and zinc oxide.

[1-3] Releasing Layer:

The recording medium of the present invention may include a releasing layer 51 like the recording medium 1 illustrated in FIG. 1. The releasing layer is a layer comprising a composition containing a release agent. When the recording medium includes the releasing layer 51, a base material sheet 50 can be easily released from the transparent sheet 52.

The kind of the release agent is not particularly limited, and a material that is excellent in releasability and is not easily melted by heat generated by a thermal inkjet recording head is preferred. Examples thereof include: a wax such as a silicone wax; a resin having a relatively high softening point such as a cellulose-based resin, an acrylic resin, a polyurethane resin, a polyvinyl alcohol resin, or a polyvinyl acetal resin; and a mixture of the resin having a relatively high softening point and the wax.

Of those, silicone-based materials such as a silicone wax and a silicone resin, and fluorine-based materials such as a fluorine resin are preferred because the materials are excellent in releasability.

The thickness of the releasing layer has only to be appropriately determined in consideration of releasability and the like, and is not particularly limited. However, the thickness of the releasing layer is preferably 0.1 µm or more and 10 µm or less in a dry state. Setting the thickness of the releasing layer to 0.1 µm or more, preferably 1 µm or more can suppress fusion between the base material sheet and the transparent sheet. Meanwhile, setting the thickness of the releasing layer to 10 µm or less, preferably 5 µm or less can suppress the thickness of an entire recorded matter to a total thickness of 0.84 mm or less described in JIS 6301 when a plastic card is used as an image support as described later.

It should be noted that when one wishes to subject the surface of the transparent sheet to matte (delustering) processing, various particles are preferably incorporated into the releasing layer, or the surface of the releasing layer on a side in abutment with the transparent sheet is preferably subjected to a matte process. The matte processing is a useful method because of its ability to moderately control the shiny appearance of the transparent sheet.

[1-4] Base Material Sheet:

The recording medium of the present invention may include the base material sheet 50 like the recording medium 1 illustrated in FIG. 1. The base material sheet (also referred to as "release liner" or "separator") is a sheet member serving as a support for the releasing layer.

The material, form, and the like of the base material sheet are not particularly limited. For example, a sheet-shaped material or the like that has been utilized as a base material film for a conventional thermal transfer sheet can be diverted. Specific examples thereof can include a resin film, a paper sheet, and a nonwoven fabric sheet.

Preferred examples thereof include: a resin film formed of a resin such as polyester (e.g., PET), nylon (aliphatic polyamide), polyimide, cellulose acetate, cellophane, polyethylene, polypropylene, polystyrene, polycarbonate, polyvinyl alcohol, polyvinyl chloride, polyvinylidene chloride, chlorinated rubber, a fluorine resin, or an ionomer; and a paper sheet formed of paper such as condenser paper or paraffin paper. Of those, a PET film excellent in weatherability is preferred. One kind of the resin film, the paper sheet, the nonwoven fabric sheet, and the like can be used alone, or two or more kinds thereof can be used in a composite or stacked manner.

The thickness of the base material sheet has only to be appropriately determined in consideration of a material strength and the like, and is not particularly limited. However, the thickness of the base material sheet is preferably 5 µm or more and 200 µm or less. Setting the thickness of the base material sheet to 5 µm or more, preferably 10 µm or more can provide a preventing effect on curling due to the lamination of the ink-receiving layer. Meanwhile, setting the thickness of the base material sheet to 200 µm or less, preferably 50 µm or less, more preferably 20 µm or less can improve thermal transference when the recording medium is pressure-bonded onto an image support under heat.

Figure 2:
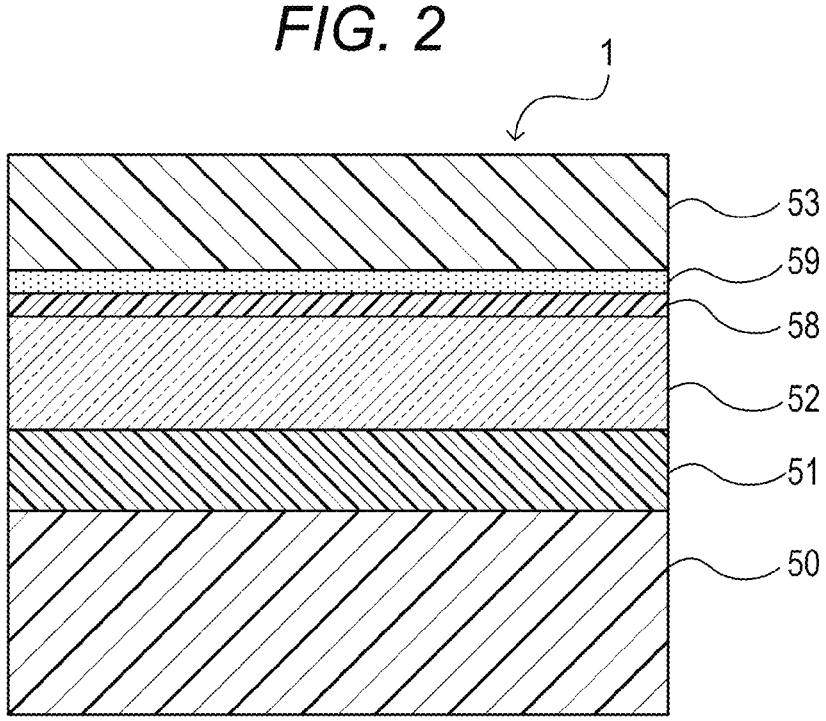
FIG. 2 is a view illustrating another embodiment of the recording medium of the present invention, the view being a cross-sectional view schematically illustrating a cross-section obtained by cutting the recording medium in its thickness direction.
Figure 20:
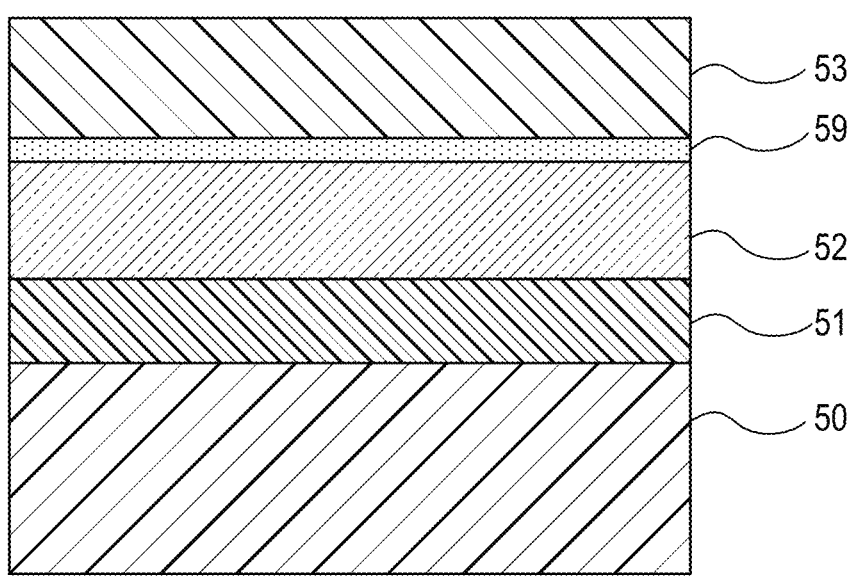
FIG. 20 is a cross-sectional view illustrating the construction of a recording medium using an anchor layer.

[1-5] Anchor Layer:

FIG. 2 is a view illustrating another embodiment of the recording medium of the present invention, the view being a cross-sectional view schematically illustrating a cross-section obtained by cutting the recording medium in its thickness direction. The recording medium of the present invention may further include an anchor layer 59 like the recording medium 1 illustrated in FIG. 2 or as illustrated in FIG. 20.

The anchor layer 59 is a layer having adhesion property, and is placed between the transparent sheet 52 and the ink-receiving layer 53. Providing the anchor layer can improve the adhesiveness and adhesive strength between the transparent sheet and the ink-receiving layer, and hence can suppress such inconvenience that the ink-receiving layer peels from the transparent sheet owing to the insufficiency of the adhesive strength. The anchor layer 59 can adopt the same construction as that of a primer layer to be described later.

Figure 24:
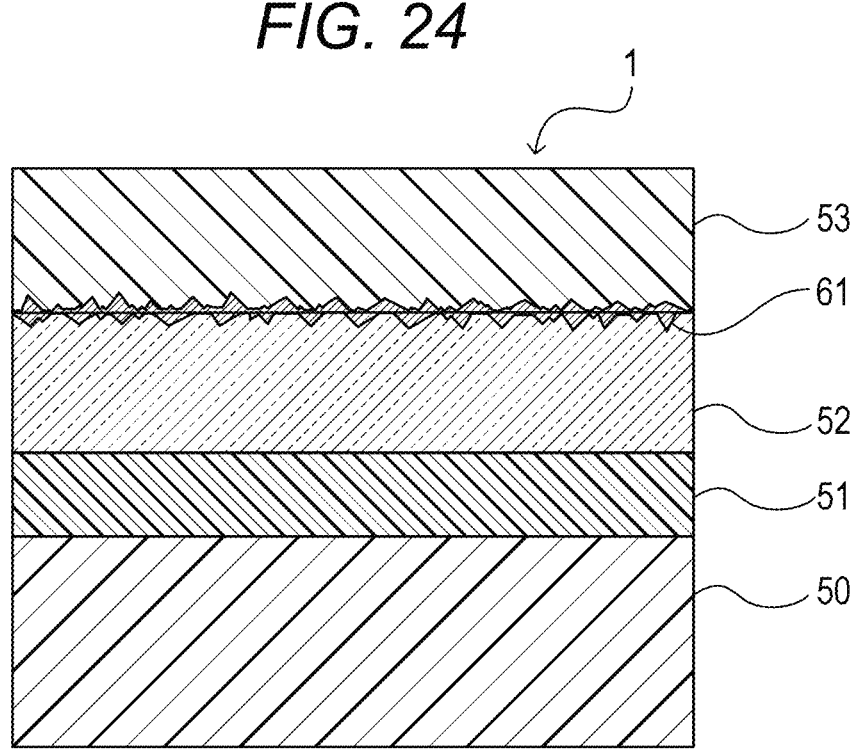
FIG. 24 is a cross-sectional view illustrating the construction of a recording medium subjected to a surface modification process.

In addition, when as illustrated in FIG. 24, the surface of the transparent sheet 52 is roughened by subjecting the surface of the transparent sheet 52 to which the ink-receiving layer is to be applied to a corona discharge process or a plasma discharge process in advance, or by applying an organic solvent such as IPA or acetone to the surface, as a surface modification process, the wettability of the sheet can be improved and the adhesiveness can be improved. Performing such anchor layer formation or surface process as described above can improve binding property between the ink-receiving layer 53 and the transparent sheet 52, can increase the film strength of the sheet, and can prevent the peeling of the transparent sheet 52.

The same material as that constituting the primer layer to be described later, the material improving the binding property, can be used in such anchor layer 59. For example, the layer can be formed by using a thermoplastic synthetic resin, a natural resin, a rubber, or a wax. More specific examples include: a cellulose derivative such as ethylcellulose or cellulose acetate propionate; a styrene-based resin such as polystyrene or poly(α-methylstyrene); an acrylic resin such as polymethyl methacrylate or polyethyl acrylate; a vinyl-based resin such as polyvinyl chloride, polyvinyl acetate, a vinyl chloride-vinyl acetate copolymer, polyvinyl butyral, or polyvinyl acetal; a synthetic resin such as a polyester resin, a polyamide resin, an epoxy resin, a polyurethane resin, an ionomer, an ethylene-acrylic acid copolymer, or an ethylene-acrylate copolymer; a tackifier such as rosin, a rosin-modified maleic acid resin, or ester gum; and a derivative of a natural resin or synthetic rubber such as a polyisobutylene rubber, a butyl rubber, a styrene-butadiene rubber, a butadiene-acrylonitrile rubber, a polyamide resin, or chlorinated polyolefin.

In addition, polyolefin resins and the like are preferably used as resins for improving the wettability of a coating liquid or improving the binding property, and polyethylene out of the resins is particularly preferably used. The polyethylene is mainly low-density polyethylene (LDPE) or high-density polyethylene (HDPE), but part of the other LLDPE, polypropylene, and the like can also be used.

The anchor layer 59 is preferably such that the anchor layer 59 is melted by a heat process with a heat roll in an adhesion step to be described later. The melting of the anchor layer 59 can additionally strengthen the binding property between the ink-receiving layer 53 and the transparent sheet 52 without being affected by the irregularities (recesses and protrusions) of the ink-receiving layer 53 and the surface of the transparent sheet 52. The heat process is preferably performed to the extent that the evaporation of the ink does not occur while adhesion property between the ink-receiving layer and the transparent sheet is expressed by melting the anchor layer with heat. Therefore, the anchor layer is preferably formed of a thermoplastic resin having a glass transition temperature (Tg) of from 60° C. to 160° C., more preferably from 70 to 140° C., particularly preferably from 70 to 100° C. The temperature range is preferably used because of the following reason: the inner pressure of the ink in the ink-receiving layer is increased even by heat applied from the recording medium 1 in an adhesion portion 29, and hence the boiling of the ink does not occur. On the other hand, a glass transition temperature of 160° C. or more is not preferred because the ink boils owing to abrupt heat and hence good adhesion therebetween is not performed.

Figure 19:
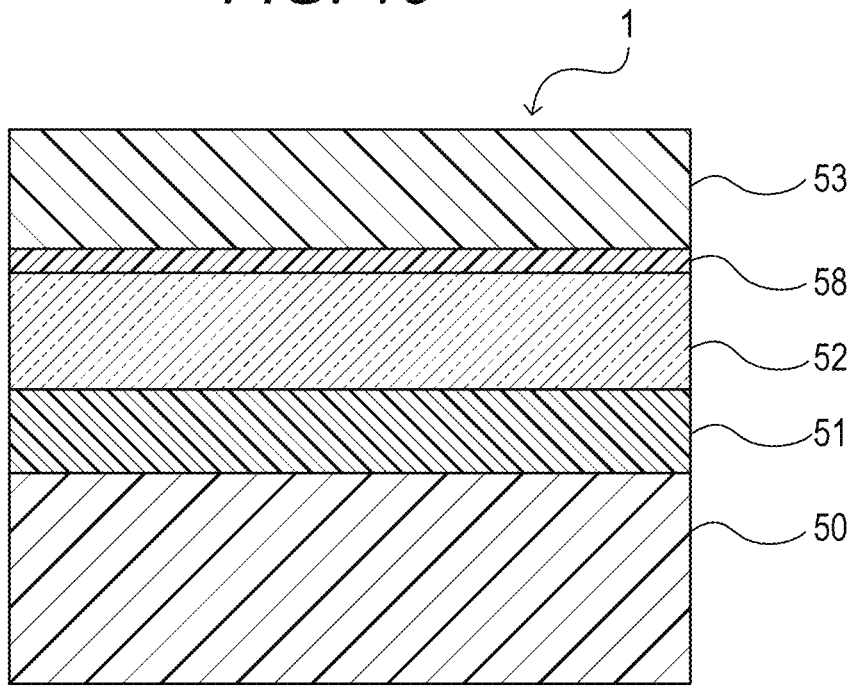
FIG. 19 is a cross-sectional view illustrating the construction of a recording medium in a fourth manufacturing apparatus.

[1-6] Hologram Layer:

The recording medium of the present invention may further include a hologram layer 58 like the recording medium 1 illustrated in FIG. 2 or as illustrated in FIG. 19. The hologram layer 58 is a layer having recorded thereon a three-dimensional image, and is placed between the transparent sheet 52 and the ink-receiving layer 53. Providing the hologram layer provides a preventing effect on the forgery of a recorded matter (such as a credit card). The construction of the hologram layer is not particularly limited and a conventionally known construction can be adopted. The construction can be, for example, a relief hologram.

When the anchor layer 59 is provided, the hologram layer 58 can be provided between the anchor layer 59 and the transparent sheet 52 as illustrated in FIG. 2. Although the hologram layer 58 is generally constituted of a resin layer, the layer itself may be of a single structure, or may be of a multilayer structure. In addition, a hologram-formed layer may be a flat hologram or may be a volume hologram, and the flat hologram, especially a relief hologram is preferred in terms of mass productivity and cost.

In addition, there can be used, for example: a laser reproduction hologram such as a Fresnel hologram, a Fraunhofer hologram, a lens-less Fourier transform hologram, or an image hologram; a white-light reproduction hologram such as a rainbow hologram; and a color hologram, computer hologram, hologram display, multiplex hologram, holographic stereogram, or holographic diffraction grating, which utilizes the principle thereof.

As a photosensitive material for forming a hologram for recording interference fringes, there can be used, for example, a silver salt, dichromated gelatin, thermoplastics, a diazo-based photosensitive material photoresist, a ferroelectric, a photochromic material, or chalcogenide glass. In addition, as a material for the hologram-formed layer, there can be used: a thermoplastic resin such as polyvinyl chloride, an acrylic resin (e.g., polymethyl methacrylate), polystyrene, or polycarbonate; a cured product of a thermosetting resin such as unsaturated polyester, melamine, epoxy, polyester (meth)acrylate, urethane (meth)acrylate, epoxy(meth)acrylate, polyether (meth)acrylate, polyol (meth)acrylate, melamine (meth)acrylate, or a triazine-based acrylate; or a mixture of the thermoplastic resin and the thermosetting resin.

Further, a thermoformable substance having a radically polymerizable unsaturated group can be used as a material for the hologram layer 58. The hologram layer 58 can be formed by a conventionally known method. For example, when a transparent hologram is a relief hologram, a hologram original plate having recorded thereon interference fringes in the forms of irregularities (recesses and protrusions) is used as a press die. Then, a resin sheet configured to form a hologram is placed on the hologram original plate, and both the plate and the sheet are thermally pressure-bonded by a unit such as a heating roll to copy the irregular pattern of the hologram original plate on the surface of the resin sheet configured to form a hologram. A hologram-formed layer having a relief-formed surface can be obtained by the foregoing method.

[1-7] Layered Structure:

The recording medium of the present invention has a layered structure in which the transparent sheet 52 and the ink-receiving layer 53 are sequentially stacked like the recording medium 1 illustrated in FIG. 1. The phrase "the transparent sheet and the ink-receiving layer are sequentially stacked" means that the transparent sheet and the ink-receiving layer are stacked according to the order irrespective of whether any other layer is interposed between the transparent sheet and the ink-receiving layer. That is, a structure in which the anchor layer 59 or the hologram layer 58 is present between the transparent sheet 52 and the ink-receiving layer 53 like the recording medium 1 illustrated in FIG. 2 is also included in the category of the layered structure in which "the transparent sheet and the ink-receiving layer are sequentially stacked."

It should be noted that the recording medium of the present invention preferably has a layered structure in which the transparent sheet 52 and the ink-receiving layer 53 are brought into abutment with each other like the recording medium 1 illustrated in FIG. 1. That is, a structure in which no other layer (including a sheet) is interposed between the transparent sheet 52 and the ink-receiving layer 53 is preferred. This is because of the following reason: there are strict restrictions on the thickness of a credit card or the like serving as an object of a recorded matter, and hence the thickness of the recorded matter is desirably reduced by reducing the number of layers or sheets to be stacked. In particular, precisely adjusting the weight-average polymerization degree and saponification degree of the polyvinyl alcohol in the ink-receiving layer significantly increases the adhesive strength between the transparent sheet and the ink-receiving layer, and hence eliminates the need for necessarily forming the anchor layer. Such construction has an advantage in that the thicknesses of the recording medium, and by extension, the recorded matter can be reduced.

When the recording medium of the present invention further includes the releasing layer 51 and the base material sheet 50 like the recording medium 1 illustrated in FIG. 1, the medium preferably has a layered structure in which the ink-receiving layer 53, the transparent sheet 52, the releasing layer 51, and the base material sheet 50 are sequentially stacked.

The recording medium of the present invention particularly preferably has a layered structure in which the transparent sheet 52 and the releasing layer 51 are brought into abutment with each other, and the releasing layer 51 and the base material sheet 50 are brought into abutment with each other like the recording medium 1 illustrated in FIG. 1 from the viewpoint of reducing the number of layers or sheets to be stacked to reduce the thickness of the recorded matter.

Figure 3:
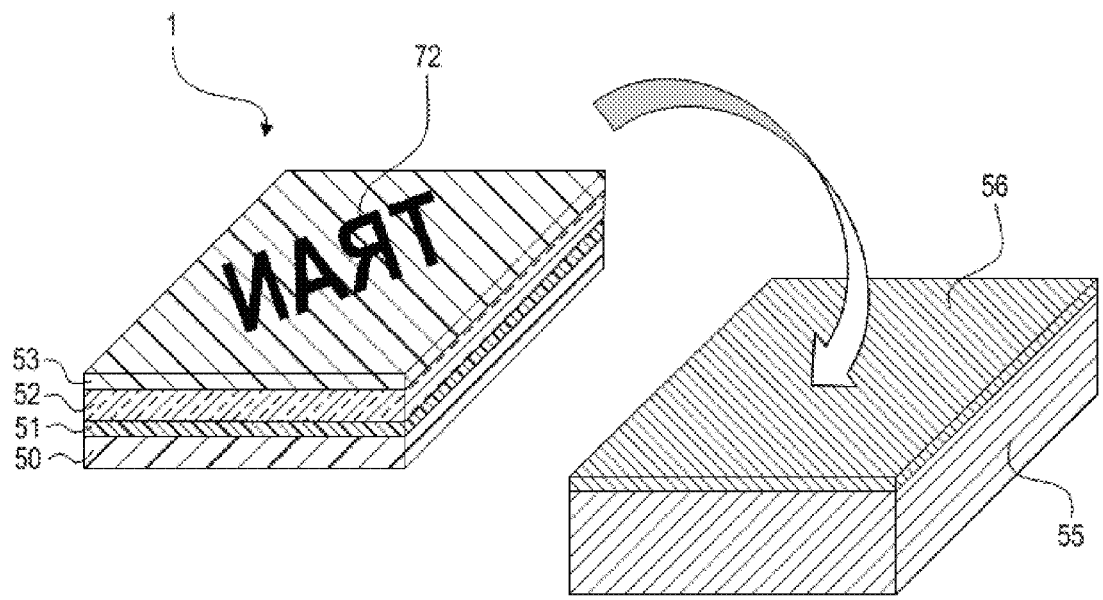
FIG. 3 is a perspective view schematically illustrating the recording medium of the present invention.

[1-8] Image:

FIG. 3 is a perspective view schematically illustrating the recording medium of the present invention. The recording medium of the present invention is preferably such that an image is formed on the ink-receiving layer, and is particularly preferably such that a reverse image 72 that serves as a mirror image as viewed from the ink-receiving layer 53 side and serves as a normal image as viewed from the transparent sheet 52 side is recorded on the ink-receiving layer 53 like the recording medium 1 illustrated in FIG. 3.

In the recording medium of the present invention, the reverse image 72 is recorded on the surface of the ink-receiving layer 53 on which the transparent sheet 52 is not stacked by an inkjet recording system like the recording medium 1 illustrated in FIG. 3. Recording the reverse image by the inkjet recording system can improve the productivity and information security of a recorded matter, and can achieve a reduction in recording cost therefor as compared with a conventional thermal transfer system.

In the recording medium of the present invention, the image may be an image formed by using a dye ink, or may be an image formed by using a pigment ink. However, the image is preferably an image formed by using the pigment ink. Forming the reverse image by using the pigment ink inhibits the remaining of the water or solvent in the ink on the surface of the ink-receiving layer (that is, facilitates the drying of the ink), and hence can effectively prevent poor adhesion between an image support and the recording medium (specifically the ink-receiving layer), and migration (the movement of the ink) resulting from the water or the solvent. Further, forming the reverse image by using the pigment ink can improve the light resistance of the reverse image.

In addition, a resin dispersion-type pigment component obtained by covering the peripheries of pigment particles with a resin is preferably used as a pigment component in the pigment ink. The use of the resin dispersion-type pigment can increase a binding force between the pigment particles after the separation of an ink medium. Further, when the image support includes a primer layer, the use can increase the binding force of each particle with the primer layer. Thus, the following state is established: water on the surface of a pigment film is substantially blocked from the water of a lower layer in the ink-receiving layer, and is substantially blocked from replenishment with water from the lower layer by the pigment film. Therefore, when the amount of the water on the surface of the pigment film is small, the ink can be sufficiently dried by natural drying.

The resin with which the peripheries of the pigment particles are covered is preferably a (meth)acrylate-based copolymer having an acid value of 100 mgKOH/g or more and 160 mgKOH/g or less. Setting the acid value to 100 mgKOH/g or more improves ejection stability in an inkjet recording system involving ejecting the ink by a thermal system. Meanwhile, setting the acid value to 160 mgKOH/g or less provides the resin with hydrophobicity relative to the pigment particles, and hence improves the fixability and exudation resistance of the ink. Therefore, the setting is suitable for the high-speed fixation of the ink and high-speed recording.

Figure 4:
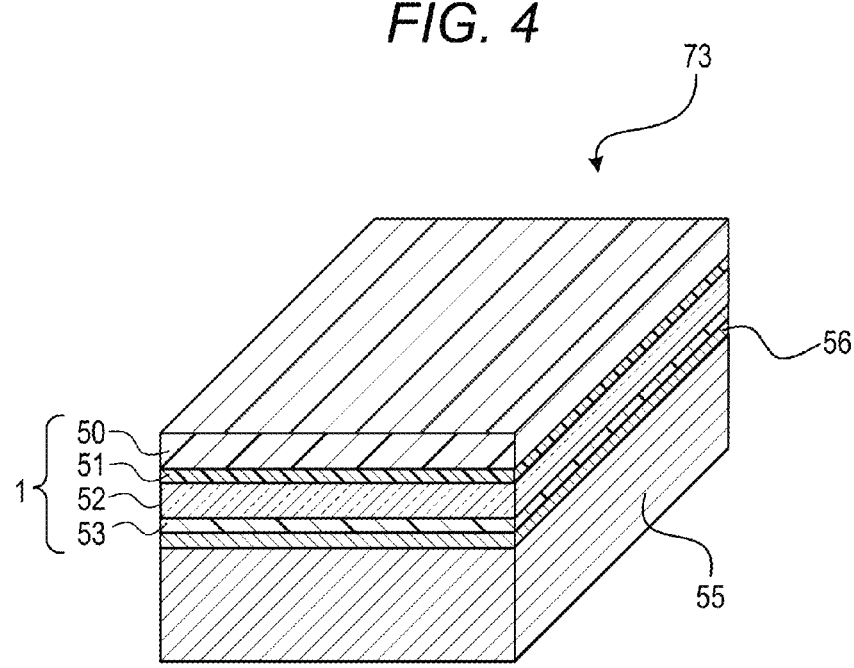
FIG. 4 is a perspective view schematically illustrating a state in which the recording medium of the present invention is bonded to an image support to form a recorded matter.
Figure 5:
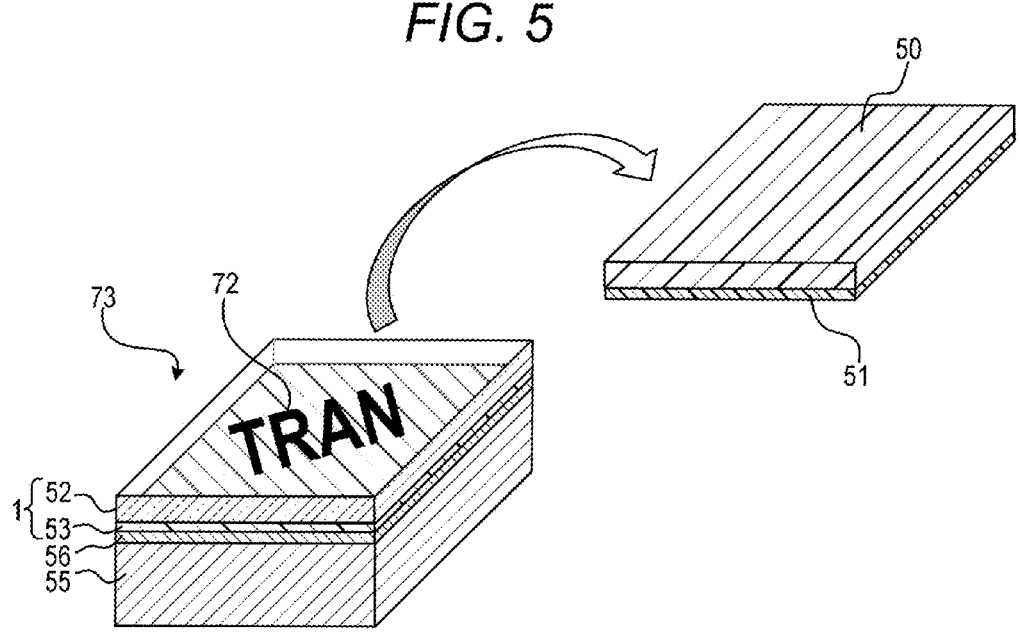
FIG. 5 is a perspective view schematically illustrating a state in which a base material sheet and a releasing layer are released from the recorded matter illustrated in FIG. 4.

[1-9] Use Method:

FIG. 4 is a perspective view schematically illustrating a state in which the recording medium of the present invention is bonded to an image support to form a recorded matter, and FIG. 5 is a perspective view schematically illustrating a state in which the base material sheet and the releasing layer are released from the recorded matter illustrated in FIG. 4.

The recording medium of the present invention is used by being bonded to an image support 55 so that the ink-receiving layer 53 is opposed to the image support 55 like the recording medium 1 illustrated in each of FIG. 3 and FIG. 4. Thus, a layered structure in which the image support 55, the ink-receiving layer 53, and the transparent sheet 52 are sequentially stacked is formed. Thus, the reverse image 72 recorded on the recording medium 1 is bonded to the image support 55.

When the recording medium further includes the releasing layer 51 and the base material sheet 50 like the recording medium 1 illustrated in each of FIG. 3 and FIG. 4, the releasing layer 51 and the base material sheet 50 are released from the surface of the transparent sheet 52 as illustrated in FIG. 5. Thus, the reverse image 72 recorded on the recording medium 1 can be viewed as a normal image as viewed from the transparent sheet 52 side.

[2] Recorded Matter:

A recorded matter of the present invention includes the image support 55 on which an image is supported and the recording medium 1 having recorded thereon the image (the reverse image 72 in the illustrated example) like a recorded matter 73 illustrated in each of FIG. 4 and FIG. 5. In addition, the recorded matter of the present invention includes the recording medium of the present invention described in the foregoing.

[2-1] Image Support:

The image support is an object on which the image of the recording medium is to be supported. The construction of the image support is not particularly limited. Examples thereof can include an image support using a resin as a constituent material (resin-based support) and an image support using paper as a constituent material (paper-based support). Examples of the resin-based support can include resin cards such as a credit card and an IC card. Examples of the paper-based support can include: paper books such as a passport; and paper cards.

[2-1-1] Resin-Based Support:

The resin constituting the resin-based support has only to be appropriately selected depending on the applications of the image support, and is not particularly limited. Examples thereof can include: polyester resins such as polyethylene terephthalate, polybutylene terephthalate, and a polyethylene terephthalate/isophthalate copolymer; polyolefin resins such as polyethylene, polypropylene, and polymethylpentene; polyethylene fluoride-based resins such as polyvinyl fluoride, polyvinylidene fluoride, polytetrafluoroethylene, and an ethylene-tetrafluoroethylene copolymer; aliphatic polyamide resins such as nylon 6 and nylon 6,6; vinyl polymer resins such as polyvinyl chloride, a vinyl chloride/vinyl acetate copolymer, an ethylene/vinyl acetate copolymer, an ethylene/vinyl alcohol copolymer, polyvinyl alcohol, and vinylon; cellulose-based resins such as cellulose triacetate and cellophane; acrylic resins such as polymethyl methacrylate, polyethyl methacrylate, polyethyl acrylate, and polybutyl acrylate; and other synthetic resins such as polystyrene, polycarbonate, polyarylate, and polyimide.

The resin constituting the resin-based support may be, for example, a biodegradable resin such as aliphatic polyester, polycarbonate, polylactic acid, polyvinyl alcohol, cellulose acetate, or polycaprolactone. In addition, the resin-based support has only to use the resin as a main constituent material, and may contain a material other than the resin such as metal foil.

[2-1-2] Paper-Based Support:

The kind of the paper constituting the paper-based support is also not particularly limited. Examples thereof include condenser paper, glassine paper, parchment paper, paper having a high size, synthetic paper (polyolefin- or polystyrene-based paper), woodfree paper, art paper, coated paper, cast-coated paper, wall paper, lining paper, synthetic resin- or emulsion-impregnated paper, synthetic rubber latex-impregnated paper, synthetic resin-internally added paper, paperboard, and cellulose fiber paper.

[2-1-3] Others:

The resin-based support and the paper-based support may each include, for example, an embossment, a sign, an IC memory (IC chip), an optical memory, a magnetic recording layer, a recording layer for preventing forgery and alteration (such as a pearl pigment layer, a watermark recording layer, or a micro character), an embossed recording layer, or an IC chip-hiding layer as required.

In addition, each of the resin-based support and the paper-based support may be constituted as a single-layer member formed of any such material as described above, or may be constituted as a multilayer member obtained by bonding two or more sheets or films different from each other in material or thickness.

Further, the thickness of the entire image support is preferably 30 μm or more and 800 μm or less. The thickness of the image support is set to preferably 30 μm or more, more preferably 500 μm or more, still more preferably 650 μm or more. Meanwhile, the thickness of the image support is set to preferably 800 μm or less, more preferably 770 μm or less. Such setting can control the thickness of the entire recorded matter to a total thickness of 0.68 mm or more and 0.84 mm or less described in JIS 6301 when a plastic card is used as the image support as described later.

Figure 15:
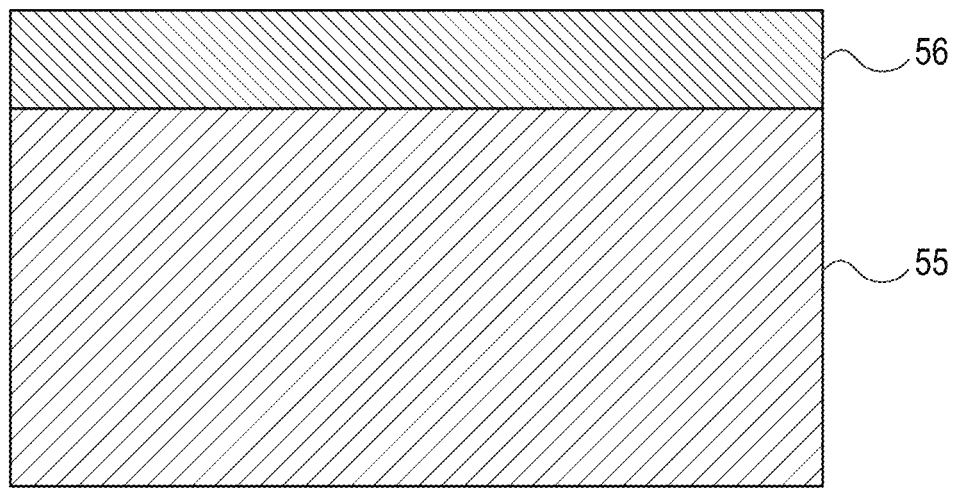
FIG. 15 is a cross-sectional view illustrating an image support and a primer layer.

[2-2] Primer Layer:

The recorded matter of the present invention is preferably such that the image support 55 further includes a primer layer 56 like the recorded matter 73 illustrated in each of FIG. 4 and FIG. 5. As illustrated in FIG. 15, the primer layer 56 is a layer having adhesion property and is placed on the surface of the image support 55. Providing the primer layer can improve the adhesiveness and adhesive strength between the image support 55 and the recording medium 1 (specifically the ink-receiving layer 53), and hence can suppress such inconvenience that the recording medium peels from the image support owing to the insufficiency of the adhesive strength.

A constituent material for the primer layer is not particularly limited. However, the layer is preferably constituted of a material that expresses adhesion property when heated such as a thermoplastic synthetic resin, a natural resin, a rubber, or a wax. More specific examples thereof can include: cellulose derivatives such as ethylcellulose and cellulose acetate propionate; styrene-based resins such as polystyrene and poly(α-methylstyrene); acrylic resins such as polymethyl methacrylate and polyethyl acrylate; vinyl-based resins such as polyvinyl chloride, polyvinyl acetate, a vinyl chloride-vinyl acetate copolymer, polyvinyl butyral, and polyvinyl acetal; other synthetic resins such as polyester, polyamide, an epoxy resin, polyurethane, an ionomer, an ethylene-acrylic acid copolymer, and an ethylene-acrylate copolymer; tackifiers such as rosin, a rosin-modified maleic acid resin, and ester gum; and synthetic rubbers such as a polyisobutylene rubber (butyl rubber), an styrene-butadiene rubber, a butadiene-acrylonitrile rubber, and chlorinated polyolefin.

When the primer layer is constituted of a thermoplastic resin, the glass transition temperature of the thermoplastic resin is preferably 60° C. or more and 160° C. or less. Setting the glass transition temperature to 60° C. or more, preferably 70° C. or more reduces the frequency at which the primer layer melts owing to an ambient temperature in an apparatus, eliminates the need for strict temperature control, and can facilitate the handling of the recording medium. Meanwhile, setting the glass transition temperature to 160° C. or less, preferably 140° C. or less, more preferably 100° C. or less inhibits the boiling of the ink constituting the reverse image of the recording medium even when the ink is heated to the temperature at which the primer layer exhibits its adhesion property, and hence improves adhesion between the recording medium and the image support.

Examples of the thermoplastic resin having a glass transition point of 60° C. or more and 160° C. or less can include polyamide, an acrylic resin, a vinyl chloride resin, a vinyl chloride-vinyl acetate copolymer, and polyester. Those resins are preferred because of their good thermal adhesion properties.

One kind of the materials can be used alone, or two or more kinds thereof can be used as a mixture in the primer layer. In addition, the thickness of the primer layer has only to be appropriately set in consideration of the kind of constituent material, required adhesion performance, applicability, and the like, and is not particularly limited. However, the thickness of the primer layer is preferably 0.5 μm or more and 10 μm or less. Setting the thickness of the primer layer to 0.5 μm or more, preferably 1.0 μm or more can provide good adhesion property even when an image support having a rough surface such as a paper-based support is used. Meanwhile, setting the thickness of the primer layer to 10 μm or less, preferably 5 μm or less can provide the following effect: the thickness of the entire recorded matter is suppressed to a total thickness of 0.84 mm or less described in JIS 6301 when a plastic card is used as the image support as described later.

It should be noted that the adhesiveness and adhesive strength between the image support and the recording medium (specifically the ink-receiving layer) can be improved by incorporating, for example, a resin exemplified as a constituent material for the primer layer into the ink-receiving layer instead of providing the image support with the primer layer.

[2-3] Layered Structure:

The recorded matter of the present invention has a layered structure in which the image support 55, the ink-receiving layer 53, and the transparent sheet 52 are sequentially stacked like the recorded matter 73 illustrated in FIG. 4 or FIG. 5. In addition, the recorded matter of the present invention may have a layered structure in which the image support 55, the primer layer 56, the ink-receiving layer 53, and the transparent sheet 52 are sequentially stacked like the recorded matter 73 illustrated in FIG. 4 or FIG. 5. In this case, the recorded matter of the present invention preferably has a layered structure in which the image support 55 and the primer layer 56 are brought into abutment with each other, and the primer layer 56 and the ink-receiving layer 53 are brought into abutment with each other like the recorded matter 73 illustrated in FIG. 4 or FIG. 5.

[3] Method of Manufacturing Recording Medium:

A method of manufacturing a recording medium of the present invention is a method of manufacturing a recording medium comprising an ink-receiving layer configured to receive an ink for inkjet recording and a transparent sheet having a total luminous transmittance of 50% or more, the medium having a layered structure in which the transparent sheet and the ink-receiving layer are sequentially stacked. It should be noted that in the following sections of the method of manufacturing a recording medium and a method of manufacturing a recorded matter, the description which has already been provided, for example, the section of the recording medium are omitted, and only a description will be provided of the manufacturing methods.

[3-1] Formation of Ink-Receiving Layer:

In a first embodiment of the method of manufacturing a recording medium of the present invention, a coating liquid containing at least water, inorganic fine particles and polyvinyl alcohol having a weight-average polymerization degree of 2,000 or more and 5,000 or less, and a saponification degree of 70 mol % or more and 90 mol % or less is applied to the surface of the transparent sheet. Thus, a gap-absorption-type ink-receiving layer comprising a composition containing at least the inorganic fine particles and the polyvinyl alcohol is formed.

In a second embodiment of the method of manufacturing a recording medium of the present invention, a coating liquid containing at least water, alumina fine particles having an average particle diameter of 120 nm or more and 200 nm or less, and at least one kind of resin selected from the group consisting of a water-soluble resin and a water-dispersible resin is applied to the surface of the transparent sheet. Thus, a gap-absorption-type ink-receiving layer comprising a composition containing at least, for example, the alumina fine particles and the water-soluble resin is formed.

[3-1-1] Transparent Sheet:

The transparent sheet may be subjected to surface modification in advance before its use. Performing surface modification for roughening the surface of the transparent sheet improves the wettability of the transparent sheet, and can improve its adhesiveness with the ink-receiving layer or an anchor layer in some cases. A method for the surface modification is not particularly limited. Examples thereof can include: a method involving subjecting the surface of the transparent sheet to a corona discharge process or a plasma discharge process in advance; and a method involving applying an organic solvent such as IPA or acetone to the surface of the transparent sheet. Any such surface process improves binding property between the ink-receiving layer and the transparent sheet, increases the strength of the transparent sheet, and can prevent such inconvenience that the ink-receiving layer peels from the transparent sheet.

In addition, the transparent sheet may be used in a state of a laminate with any other layer or sheet. For example, a layered sheet in which the transparent sheet, a releasing layer comprising a composition containing a release agent, and a base material sheet serving as a support for the releasing layer are sequentially stacked is preferably used.

The releasing layer can be formed by: applying a coating liquid containing a resin or wax for constituting the releasing layer to, for example, a resin film constituting a base material sheet; and drying the liquid. Examples of a method for the application can include conventionally known application methods such as a gravure recording method, a screen recording method, and a reverse roll coating method involving using a photogravure plate.

In addition, an anchor layer may be formed on the transparent sheet in advance before its use.

[3-1-2] Coating Liquid:

The ink-receiving layer is obtained by: mixing the inorganic fine particles, the water-soluble resin and/or the water-dispersible resin, and an aqueous medium to prepare a coating liquid; applying the liquid to the surface of a base material; and drying the liquid to form the ink-receiving layer.

In the first embodiment of the method of manufacturing a recording medium of the present invention, a coating liquid containing at least water, inorganic fine particles and polyvinyl alcohol having a weight-average polymerization degree of 2,000 or more and 5,000 or less, and a saponification degree of 70 mol % or more and 90 mol % or less is used as the coating liquid.

In the second embodiment of the method of manufacturing a recording medium of the present invention, a coating liquid containing at least water, alumina fine particles having an average particle diameter of 120 nm or more and 190 nm or less, and at least one kind of resin selected from the group consisting of a water-soluble resin and a water-dispersible resin is used as the coating liquid.

An aqueous medium is preferably used as the medium of the coating liquid. Examples of the aqueous medium can include water, and a mixed solvent of water and a water-soluble organic solvent. Examples of the water-soluble organic solvent can include: an alcohol such as methanol, ethanol, or propanol; a lower alkyl ether of a polyhydric alcohol such as ethylene glycol monomethyl ether or ethylene glycol dimethyl ether; a ketone such as acetone or methyl ethyl ketone; and an ether such as tetrahydrofuran.

A coating liquid further containing a thermal bonding resin is preferably used as the coating liquid. A material exemplified in the section of the primer layer, especially a thermoplastic resin having a glass transition temperature of 60° C. or more and 160° C. or less is preferably used as the thermal bonding resin. In addition, a polyolefin resin or the like is preferably incorporated into the coating liquid in order to improve its wettability, and improving the binding property. Of such resins, polyethylene is preferably incorporated. Examples of the polyethylene can include low-density polyethylene (LDPE) and high-density polyethylene (HDPE). It should be noted that linear low-density polyethylene (LLDPE), polypropylene, or the like can also be used.

Various additives can be incorporated into the coating liquid as long as the effects of the present invention are not impaired. When a dye ink is used as an ink for recording a reverse image, a dye-fixing agent is preferably incorporated. The dye-fixing agent bonds to an anionic group of a dye molecule to form a salt, thereby making the dye insoluble in water. Thus, the agent can prevent migration.

Other examples of the additives can include a surfactant, a pigment-dispersing agent, a thickener, an antifoaming agent, an ink-fixing agent, a dot regulator, a colorant, a fluorescent whitening agent, an antioxidant, a UV absorber, an antiseptic, and a pH regulator.

The concentration of the inorganic fine particles in the coating liquid has only to be appropriately determined in consideration of the applicability of the coating liquid and the like, and is not particularly limited. However, the concentration is preferably set to 10 mass % or more and 30 mass % or less with respect to the total mass of the coating liquid.

Further, a resin having adhesion property to be used in a primer layer to be described later is preferably used in the ink-receiving layer for the purposes of adjusting the film strength of the ink-receiving layer, and strengthening an adhesive strength between the ink-receiving layer and an image support (transfer member). When the resin to be used in the primer layer is used in the ink-receiving layer, adhesion property between the image support to be described later and the ink-receiving layer can be obtained even when the primer layer is not used. In addition, its adhesion property with the image support can be additionally strengthened by melting the ink-receiving layer. Further, the film strength of an applied film can be weakened, and hence the releasability of the ink-receiving layer at the time of retransfer to be described later can be improved. In addition, the pores of the ink-receiving layer can be filled by melting the resin in the ink-receiving layer through heating at the time of the retransfer, and hence the movement (migration) of an aqueous ink due to the water or solvent remaining in the ink can be prevented. However, when the resin having adhesion property is incorporated into the ink-receiving layer, the pores may be filled with the resin, and hence the absorbability of the ink reduces and image quality reduces in some cases.

Figure 6:
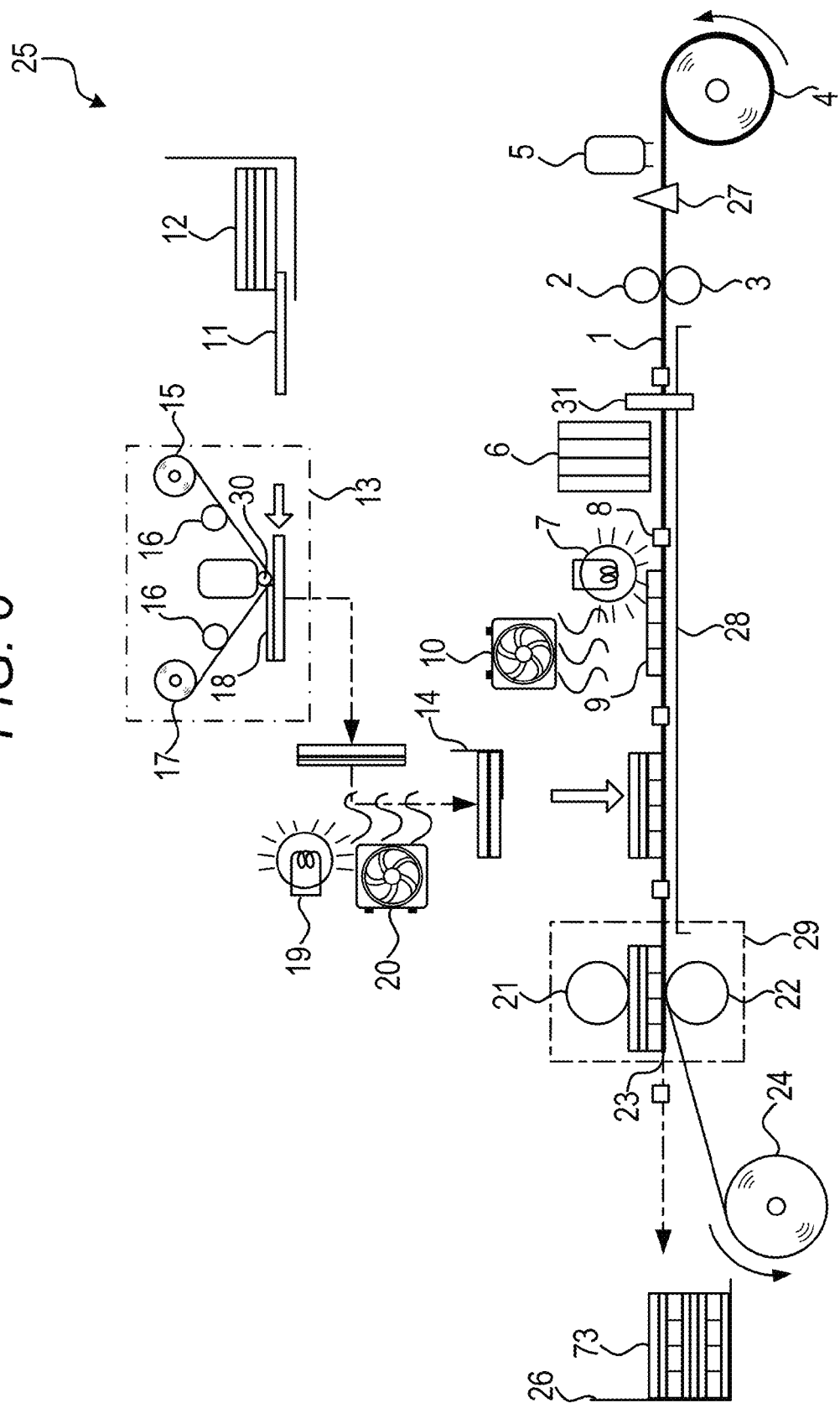
FIG. 6 is a side view schematically illustrating a first construction example of a manufacturing apparatus for manufacturing a recorded matter of the present invention.

It should be noted that when the resin having adhesion property is used in the ink-receiving layer, a predrying temperature upon performance of water evaporation control in a drying portion 7 of a manufacturing apparatus 25 illustrated in FIG. 6 is set to be equal to or less than the Tg temperature of the resin having adhesion property.

In addition, in general, a dye-fixing agent may be used for the purpose of improving the water resistance of the recording medium. Such dye-fixing agent forms a salt with the dye in the ink having an anionic group to make the dye insoluble in water, thereby preventing the migration.

[3-1-3] Application:

The formation of the ink-receiving layer is performed by applying the coating liquid to the surface of the transparent sheet. After the application, the coating liquid is dried as required. Thus, a recording medium having a layered structure in which the transparent sheet and the ink-receiving layer are sequentially stacked can be obtained.

When the layered sheet in which the transparent sheet, the releasing layer, and the base material sheet are sequentially stacked is used, the coating liquid has only to be applied to the surface of the transparent sheet constituting the layered sheet. Thus, such recording medium 1 having a layered structure in which the ink-receiving layer 53, the transparent sheet 52, the releasing layer 51, and the base material sheet 50 are sequentially stacked as illustrated in FIG. 1 can be obtained.

A conventionally known application method can be used as a method for the application. Examples thereof can include a blade coating method, an air knife coating method, a curtain coating method, a slot die coating method, a bar coating method, a gravure coating method, and a roll coating method.

The coating weight of the coating liquid is preferably set to 8 $g/m^2$ or more and 25 $g/m^2$ or less in terms of solid content. Setting the coating weight to 8 $g/m^2$ or more, preferably 10 $g/m^2$ or more can result in the formation of an ink-receiving layer excellent in absorbability of water in the ink. Therefore, the setting can suppress such inconvenience that the ink in the recorded reverse image smears or the reverse image blurs. Meanwhile, setting the coating weight to 25 $g/m^2$ or less, preferably 18 $g/m^2$ or less inhibits the occurrence of the curling of the recording medium upon drying of the applied layer. In addition, reducing the thickness of the ink-receiving layer can reduce the thickness of a recorded matter to be finally formed. When the image support is a plastic card such as a credit card, its thickness is strictly specified by Japanese Industrial Standards (JIS-X-6305) and hence it is effective to adopt the above-mentioned coating weight. It should be noted that when the coating weight is set to 25 $g/m^2$ or less, the thickness of the ink-receiving layer reduces and hence there is no need to perform a precut process to be described later.

[3-2] Precut Process:

In the method of manufacturing a recording medium of the present invention, a precut process of making notches into part of the ink-receiving layer and the transparent sheet from the ink-receiving layer side after the formation of the ink-receiving layer may be performed. As a result of the precut process, the transparent sheet can be beautifully cut by using the notches as starting points after a reverse image has been recorded on the recording medium to provide a recording medium, and the recording medium and an image support have been adhered to each other. Therefore, a strong protective layer formed of a transparent sheet having a uniform thickness can be formed, and sufficient durability is imparted to the reverse image formed on the ink-receiving layer.

[3-3] Recording of Reverse Image:

Next, a reverse image that serves as a mirror image as viewed from the ink-receiving layer side and serves as a normal image as viewed from the transparent sheet side is recorded on the surface of the ink-receiving layer in the recording medium on which the transparent sheet is not stacked by an inkjet recording system. Thus, as illustrated in FIG. 3, the reverse image 72 is recorded on the ink-receiving layer 53 of the recording medium 1.

The inkjet recording system is a system involving ejecting an ink (ink droplets) from a plurality of nozzles formed in a recording head onto a recording medium to record an image. The kind of the inkjet recording system is not particularly limited. However, a thermal inkjet recording system involving forming air bubbles through film boiling caused by the application of a thermal energy according to a driving pulse to an ink in nozzles and ejecting ink droplets from the nozzles with the air bubbles is preferred.

The inkjet recording system can be performed by an inkjet recording apparatus (inkjet printer). The inkjet printer is preferred because of the following reason: a recording head thereof and a recording medium are out of contact with each other at the time of image recording, and hence the apparatus can perform extremely stable image recording. The kind of the inkjet printer is not particularly limited. However, there is preferably used a full-line inkjet printer including a line head in which a large number of multi-nozzle heads in each of which a plurality of nozzles each formed of, for example, an ink ejection port and an ink flow path are integrated are arrayed so as to be perpendicular to the conveying direction of a recording medium. The full-line inkjet printer performs image recording by simultaneously ejecting ink droplets from the ink ejection ports of the plurality of nozzles according to the conveyance of the recording medium. Accordingly, the printer can record a high-quality and high-resolution image at a high speed. This is why the printer is preferred.

In the method of manufacturing a recording medium of the present invention, a pigment ink is preferably used as an ink for inkjet recording for forming a reverse image. In particular, in the second embodiment of the recording medium of the present invention, the transparency of the ink-receiving layer has been significantly improved by precisely controlling the particle diameters of the alumina particles of the ink-receiving layer. Therefore, even a reverse image recorded by using a pigment ink that hardly permeates the inside of the ink-receiving layer from its surface can be viewed as a clear image through the transparent sheet.

The ink ejection amount of a recording head is preferably 20 pl (picoliters) or less. Setting the ink ejection amount to 20 pl or less, preferably 10 pl or less, more preferably 5 pl or less can control the water content of the ink to a proper level in the step of thermally pressure-bonding the recording medium and the image support. In addition, reducing the ejection amount can suppress the spread of the ink in the ink-receiving layer, and hence enables the recording of a reverse image that is dense and has a sufficient density. Further, the reduction can suppress the thickness of an image layer (ink layer).

[3-4] Drying of Ink:

In the method of manufacturing a recording medium of the present invention, the ink for inkjet recording forming the image is preferably dried until its water content becomes 70 mass % or less with respect to the total ejection amount of the ink. Setting the water content of the ink to 70 mass % or less, preferably 50 mass % or less suppresses abrupt evaporation of an ink component upon thermal pressure bonding of the image support and the recording medium, and hence can prevent inconvenience such as a reduction in adhesive strength between the image support and the recording medium, or the remaining of air bubbles in the ink-receiving layer. It should be noted that the term "water content" as used herein means the total amount of, for example, water and a nonvolatile solvent excluding a coloring material.

The total ejection amount of the ink can be adjusted depending on the ink ejection amount of the recording head. The ejection amount may be limited by, for example, thinning out the number of dots at the time of image recording in advance so that the water content can be easily controlled.

The drying can be performed with, for example, a heater (heat source) such as a halogen heater, or an exhaust apparatus such as a fan. It should be noted that natural drying may be promoted by conveying the recording medium along a conveying path having a sufficient length without providing a special drying unit such as a heater.

[4] Method of Manufacturing Recorded Matter:

A method of manufacturing a recorded matter of the present invention is a method of manufacturing a recorded matter comprising an image support on which an image is supported and a recording medium having recorded thereon a reverse image.

[4-1] Manufacture of Recording Medium:

First, the recording medium is obtained by the method of manufacturing a recording medium of the present invention.

[4-2] Image Support:

The resin-based support, paper-based support, and the like described in the section of the recorded matter can each be used as the image support. Of those, for example, resin cards (plastic cards) such as a credit card and an IC card, and paper books such as a passport are preferred.

An image support further including a primer layer may be used as the image support. A method of forming the primer layer is not particularly limited. However, the primer layer is preferably formed by laminating a sheet formed of a material exemplified in the section of the primer layer, especially a thermoplastic resin having a glass transition temperature of 60° C. or more and 160° C. or less on the image support to provide a laminate, and thermally pressure-bonding the laminate. Examples of a method for the thermal pressure bonding can include a method involving entirely heating the laminate with a heat roller, and a method involving selectively heating a specific portion of the laminate with a thermal head.

[4-3] Thermal Pressure Bonding of Recording Medium and Image Support:

The image support and the recording medium are thermally pressure-bonded in a state of being brought into abutment so that the image support, the ink-receiving layer, and the transparent sheet are sequentially stacked. Thus, a recorded matter having a layered structure in which the image support, the ink-receiving layer, and the transparent sheet are sequentially stacked is obtained.

In addition, when an image support further including a primer layer is used as the image support, the image support and the recording medium are placed so that the image support, the primer layer, the ink-receiving layer, and the transparent sheet are sequentially stacked, and the image support and the recording medium are thermally pressure-bonded. Thus, such recorded matter 73 having a layered structure in which the image support 55, the primer layer 56, the ink-receiving layer 53, and the transparent sheet 52 are sequentially stacked as illustrated in FIG. 4 is obtained.

A temperature during the thermal pressure bonding is preferably controlled to 60° C. or more and 160° C. or less. Setting the temperature during the thermal pressure bonding to 60° C. or more causes the thermoplastic resin in the primer layer (or an anchor layer or the ink-receiving layer) to melt to an extent sufficient for adhesion, and hence can pressure-bond the image support and the recording medium. Meanwhile, setting the temperature during the thermal pressure bonding to 160° C. or less suppresses abrupt evaporation of an ink component upon thermal pressure bonding of the image support and the recording medium, and hence can prevent inconvenience such as a reduction in adhesive strength between the image support and the recording medium, or the remaining of air bubbles in the ink-receiving layer.

A method of the thermal pressure bonding is not particularly limited. The method can be, for example, a method involving: laminating the recording medium on the image support to provide a laminate; sandwiching the laminate between a pair of heat rollers; and thermally pressure-bonding the laminate. In this case, the surface temperature of each heat roller is preferably set to 100° C. or more and 180° C. or less. Thus, even when the conveying speed of the laminate is so high that a heating time cannot be sufficiently secured, the laminate can be heated to 60° C. or more and 160° C. or less.

[4-4] Peeling of Base Material Sheet and Releasing Layer:

In the recorded matter obtained as described in the foregoing, the base material sheet 50 and the releasing layer 51 are finally released as illustrated in FIG. 5. Thus, the recorded matter 73 of a structure in which the image support 55, the primer layer 56, the ink-receiving layer 53, and the transparent sheet 52 are sequentially stacked is obtained. In the recorded matter 73, the transparent sheet 52 is positioned in the uppermost layer to protect the reverse image 72 recorded on the ink-receiving layer 53 positioned below the sheet. In addition, the recording medium 1 and the image support 55 are closely adhered and fixed to each other in a sufficient manner through the primer layer 56.

[5] First Manufacturing Apparatus:

FIG. 6 is a side view schematically illustrating a first construction example of a manufacturing apparatus for manufacturing the recorded matter of the present invention (hereinafter sometimes referred to as "first manufacturing apparatus").

[5-1] Main Construction:

The manufacturing apparatus 25 includes: a supply portion 4 for supplying the recording medium 1 rolled in a roll shape to a conveying path; and a recording portion 6 for directly ejecting an aqueous ink containing a coloring material, water, a nonvolatile organic solvent, and the like onto the recording medium 1 supplied to the conveying path to record a reverse image.

In addition, the manufacturing apparatus 25 includes: a drying portion 7 for evaporating water in the recording medium 1 having applied thereto the ink to improve its adhesiveness with an image support 11; a fan 10 for preventing condensation in the apparatus due to the evaporated water; and a transfer portion 13 for transferring, onto the surface of the image support 11, a primer layer 18 for adhering the recording medium 1 having the reverse image recorded thereon in the recording portion 6 to the image support 11.

Further, the manufacturing apparatus 25 includes: a preheating portion 19 for heating the primer layer 18 transferred onto the image support 11 to improve its adhesiveness with the recording medium 1; the adhesion portion 29 for adhering an ink-receiving layer having recorded thereon the reverse image and a transparent sheet 23 to the image support 11; and a discharge portion 26 in which the image support 11 having recorded thereon the reverse image is discharged and accumulated.

[5-2] Operation:

The supply portion 4 rotates the recording medium 1 in a roll shape in a direction indicated by an arrow in FIG. 6 to supply the recording medium 1 to the recording portion 6 and the drying portion 7. At this time, the recording medium 1 is conveyed in a flat state to the recording portion 6 while being guided by a sheet guide 27, and being sandwiched between a grip roller 3 and a nip roller 2.

When the conveyance of the recording medium 1 from the supply portion 4 is started, a sensor portion 31 detects a portion 8 to be detected (through-hole) subjected to a precut process in a precut processing portion 5, and the recording portion 6 records a reverse image 9 on the ink-receiving layer of the recording medium 1. When a recording operation is completed, the recording medium 1 passes a gap between the drying portion 7 and a guide plate 28. The drying portion 7 evaporates, for example, water in an ink forming the reverse image 9, and the fan 10 evacuates the evaporated water. Thus, such a recording medium that the reverse image 9 is recorded on the ink-receiving layer of the recording medium 1 is obtained.

Meanwhile, an image support supply portion 12 supplies the image supports 11 one by one to the transfer portion 13. The transfer portion 13 supplies the primer layer 18 from a supply roll 15, passes the layer through a gap between a thermal head 30 and the image support 11, and rolls the layer around a rolling-up roll 17. At this time, the primer layer 18 is supported by guide rolls 16. The primer layer 18 is transferred onto the image support 11 by the thermal head 30.

The preheating portion 19 preheats the primer layer 18 in order to improve its adhesiveness with the recording medium 1. At this time, a fan 20 evacuates, for example, a solvent that has evaporated from the primer layer 18. Further, a registration guide 14 performs positioning between the image support 11 and the recording medium 1. After that, the image support 11 is stacked on the recording medium 1.

The laminate of the image support 11 and the recording medium 1 is conveyed to the adhesion portion 29. The adhesion portion 29 includes a pair of heat rollers 21, 22. When the laminate passes a gap between the pair of heat rollers 21, 22, the image support 11 and the recording medium 1 are thermally pressure-bonded. After that, a base material sheet and releasing layer constituting the recording medium 1 are released and rolled around a take-up roll 24. The recorded matter 73 in which the recording medium 1 is pressure-bonded onto the image support 11 under heat can be obtained through such operations.

Figure 8:
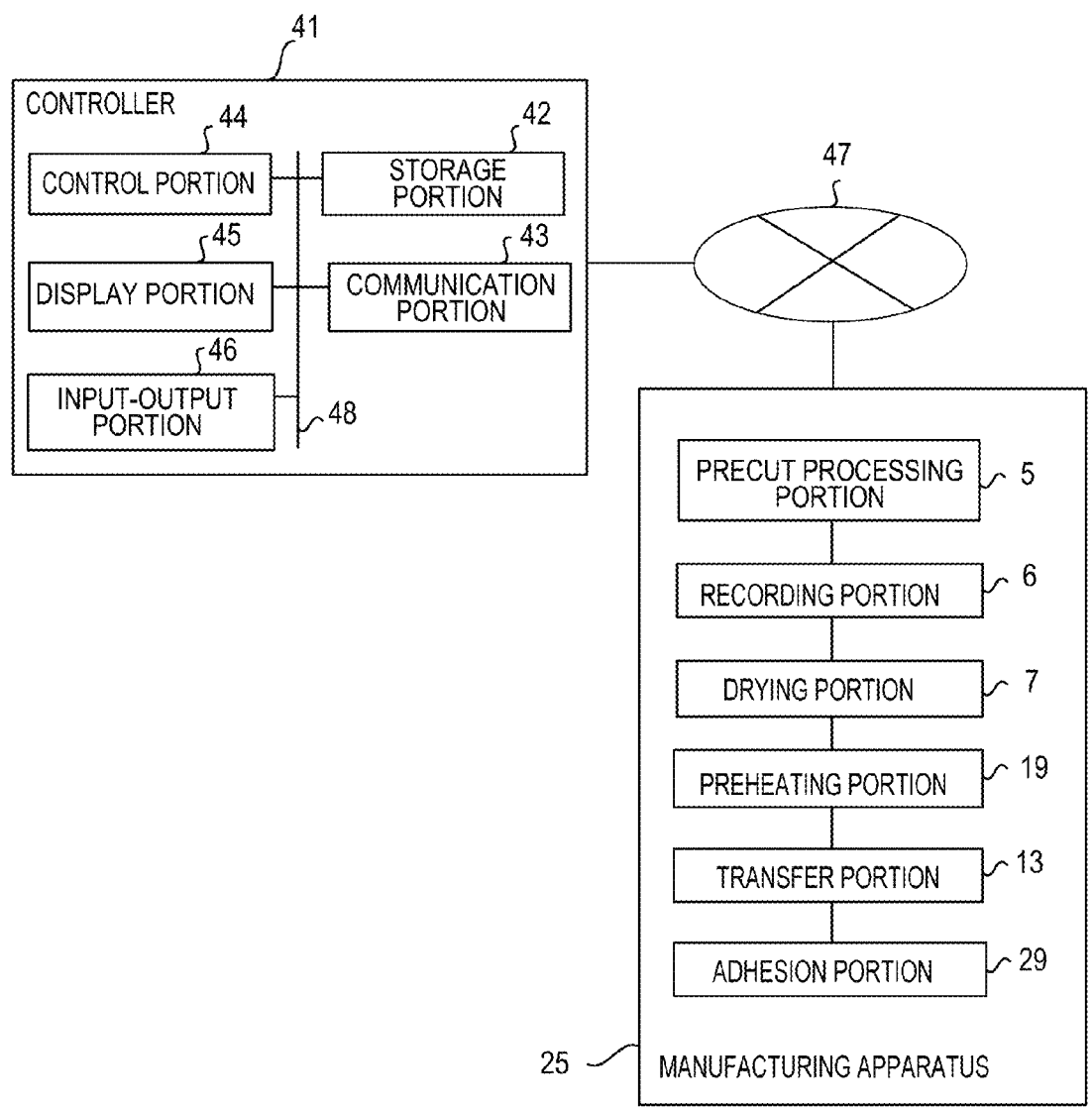
FIG. 8 is a block diagram illustrating a state of connection between a first manufacturing apparatus and a controller.

[5-3] Connection Between First Manufacturing Apparatus and Controller:

As illustrated in FIG. 8, the manufacturing apparatus 25 (image-forming/recording apparatus) is connected to a controller 41 through a network 47. It should be noted that the manufacturing apparatus 25 can be connected to the controller 41 through, for example, a serial port, a parallel port, or a USB port without through the network 47. As described in the foregoing, the manufacturing apparatus 25 includes the precut processing portion 5, the recording portion 6, the drying portion 7, the preheating portion 19, the transfer portion 13, and the adhesion portion 29. In addition, a CPU to be described later is provided in the recording portion 6, and the precut processing portion 5, the drying portion 7, the preheating portion 19, the transfer portion 13, and the adhesion portion 29 are connected to the recording portion 6. In addition, a CPU 100 is configured to control the operations of the precut processing portion 5, the recording portion 6, the drying portion 7, the preheating portion 19, the transfer portion 13, and the adhesion portion 29.

The network 47 is a network such as the Internet or a local area network (LAN), and may be a wired network or may be a wireless network. The controller 41 is a computer for controlling the manufacturing apparatus 25. In the controller 41, a control portion 44, a display portion 45, an input-output portion 46, a storage portion 42, and a communication portion 43 are connected to one another through a system bus 48. In addition, for example, a digital camera, or a drive apparatus for reading image data or the like may be connected to the controller 41. Further, a plate-making apparatus or the like may be connected to the controller 41.

The control portion 44 includes, for example, a central processing unit (CPU), a random access memory (RAM), and a read only memory (ROM). The CPU calls a program stored in the recording portion, ROM, or the like in a work memory region on the RAM, and executes the program to perform arithmetic processing and operation control, thereby controlling an entire system. The ROM is a non-volatile memory and permanently holds a program, data, or the like. In addition, the RAM is a volatile memory and temporarily holds a program, data, or the like.

The display portion 45 is, for example, a display apparatus such as: a display apparatus such as a CRT monitor or a liquid crystal panel; or a logic circuit (such as a video adaptor) for realizing the video function of a computer in concert with the display apparatus.

The input-output portion 46 is a portion for performing the input and output of data. A portion for inputting data is, for example, a keyboard, a pointing device such as a mouse, or a ten key, and actuation instructions, operation instructions, data input, maintenance, or the like can be performed on the controller 41 through such input portion. In addition, the input-output portion is connected to, for example, a scanner or drive apparatus (not shown), and transmits data input from such external apparatus to the control portion 44 or outputs data to the external apparatus.

The storage portion 42 is an apparatus for storing data, and examples thereof include a magnetic disk, a memory, and an optical disc apparatus. Stored in the storage portion 42 are, for example, the program to be executed by the control portion 44, data needed for executing the program, and an operating system (OS). A pattern to be recorded in the recording portion 6 of the manufacturing apparatus 25 can also be stored. The communication portion 43 is a communication interface that mediates communication between the controller 41 and the network 47, and includes, for example, a communication control apparatus and a communication port. It should be noted that a personal computer or the like can be used instead of the controller 41.

[5-4] Control System:

FIG. 9 is a block diagram illustrating the construction of a control system provided in the recording portion 6 illustrated in FIG. 8. The recording data or command transmitted from a host PC 120 is received by the CPU 100 through an interface controller 102. The CPU 100 is an arithmetic processing unit that governs general control such as the receiving and recording operations on the recording data of the recording portion, and the handling of rolled paper P. After having analyzed a received command, the CPU 100 performs the bit map development of image data on each color component of the recording data in an image memory 106. As an operation process before the recording, the CPU drives a capping motor 122 and a head up-and-down motor 118 through an output port 114 and a motor driving portion 116 to move each recording head 22K, 22C, 22M, 22Y from a capping position (waiting position) to a recording position (image-forming position).

Subsequently, the sensor portion 31 (tip-detecting sensor) for determining the timing (recording timing) at which the ejection of the ink onto the recording medium conveyed at a constant speed is started detects the position of the recording medium. After that, the CPU 100 sequentially reads out recording data on the corresponding color from the image memory 106 in synchronization with the conveyance of the recording medium, and transmits the readout data to the respective recording heads 22K, 22C, 22M, 22Y through a recording head control circuit 112. Thus, ejection energy-generating elements provided in the respective nozzles of the recording heads are driven according to the recording data, and ink droplets are ejected from the nozzles by the driven ejection energy-generating elements. The ejected ink droplets impinge on the ink-receiving layer (ink-receiving portion) of the recording medium positioned so as to be opposite to the recording heads to form dots. A desired image is formed by the aggregation of the dots.

It should be noted that such operation of the CPU 100 as described above is performed based on a processing program stored in a program ROM 104. The program ROM 104 stores, for example, a processing program and table corresponding to a control flow. In addition, a work RAM 108 is used as a working memory.

Figure 10B:
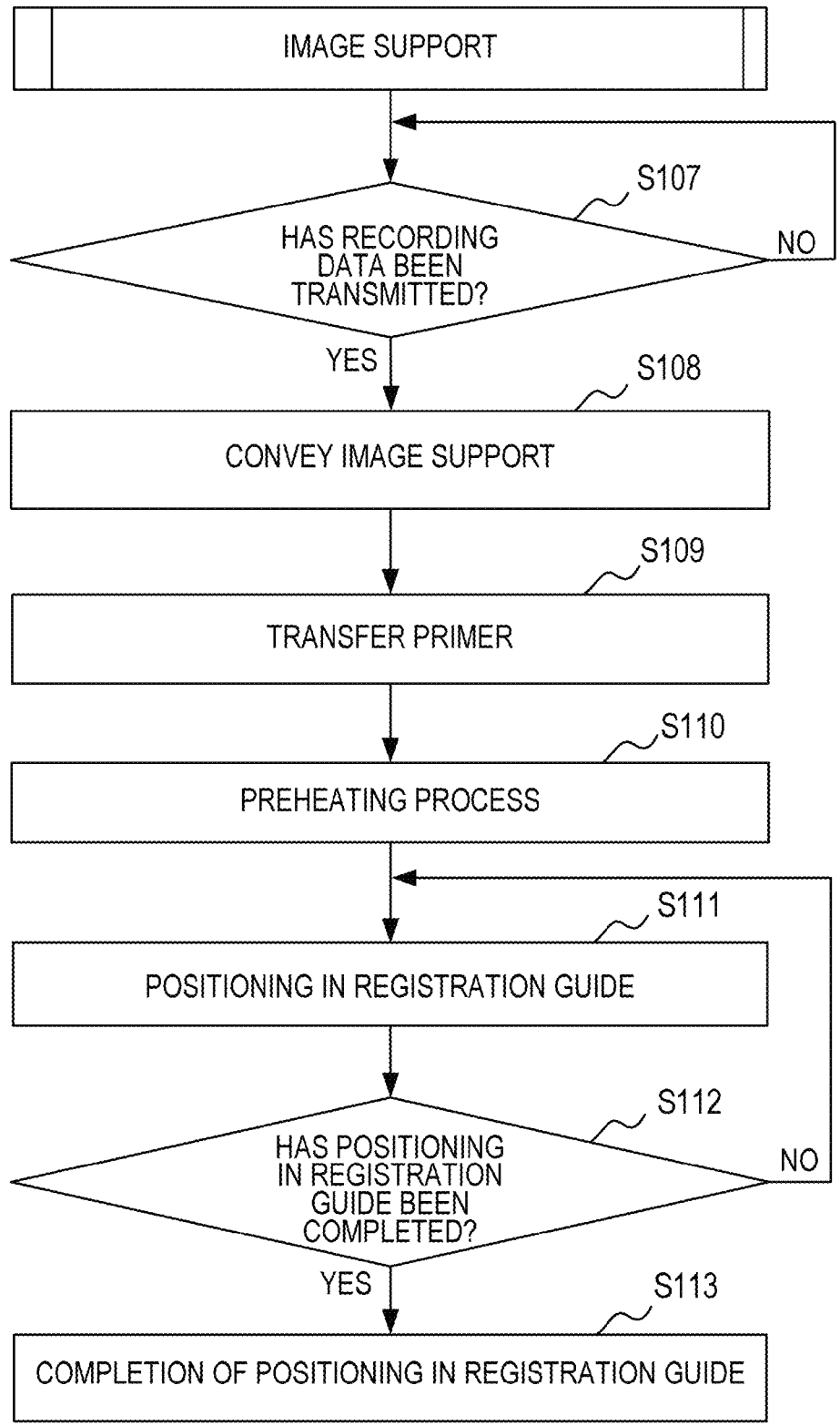

[5-5] Operation Flow of First Manufacturing Apparatus:

Next, the operation flow of the first manufacturing apparatus illustrated in FIG. 6 is described according to the flow charts of FIGS. 10A and 10B. The flow charts are performed by the CPU 100 illustrated in FIG. 9.

The CPU of the recording portion judges whether the recording data has been transmitted from the controller through the network or various ports (S101), and when it is judged that the recording data has been transmitted (YES of S101), the supply of an unrecorded recording medium from the supply portion is started (S102). At this time, the sensor portion detects the portion to be detected (through-hole) subjected to the precut process in the precut processing portion, and when the sensor portion does not detect the portion to be detected (is in an off-state (YES of S103)), a recording operation (S104) on the recording medium by the recording portion is started (S104). After that, when the recording operation is completed (YES of S105), the drying portion performs a drying process for evaporating redundant water from the recording medium having an image recorded thereon by the recording portion (S106). The foregoing operations are each based on the time point at which the sensor portion detects the portion to be detected, and are performed in synchronization with each other. It should be noted that the portion to be detected processed by the precut processing portion may be formed in advance on the recording medium.

Figure 12:
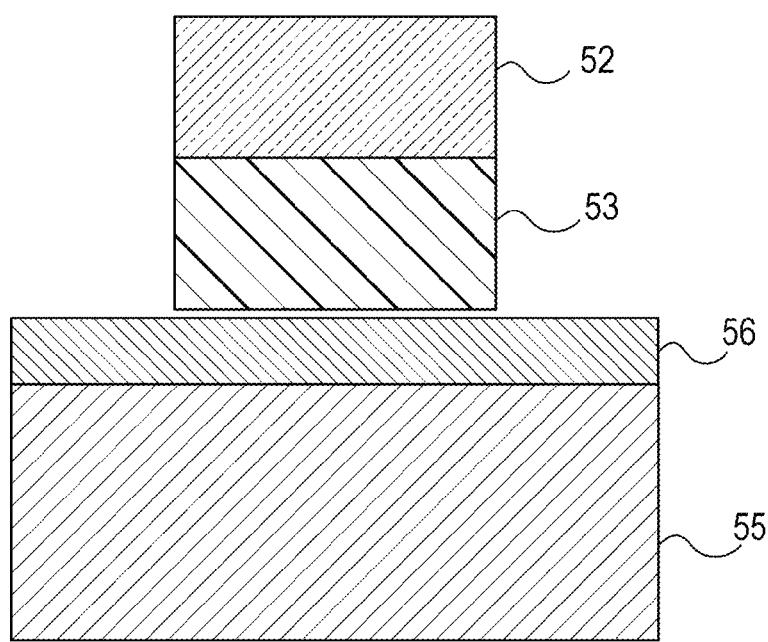
FIG. 12 is a cross-sectional view illustrating the construction of a recorded matter.

Meanwhile, when the recording data is transmitted to the CPU as described in the foregoing (YES of S107), the image support is conveyed from the image support supply portion to the transfer portion (primer transfer portion) (S108). In the transfer portion, a sheet-shaped primer is supplied onto the conveyed image support and the primer is transferred onto the image support by the thermal head (S109). After that, a preheating process by the preheating portion is performed (S110) in order to improve the adhesiveness of the primer with the recording medium 1 on which an image has been recorded by the recording portion, positioning between the image support and the recording medium is started in the registration guide (S111), and when the positioning with the recording medium is completed (S113), the flow proceeds to the next step. At this time, a YES judgment is made at Step S114, the image support is mounted on the recording medium, and the recording medium and the image support are adhered to each other through the primer by the adhesion portion (S115). After that, in association with the conveyance of the recording medium toward a downstream side, the base material of the recording medium peels by using a portion precut by the precut processing portion as a starting point, and a recorded matter (final recorded matter) is mounted on the discharge portion (S116). The recorded matter has the transparent sheet 52 adhered to sandwich the ink-receiving layer 53 as illustrated in FIG. 12, and hence the recorded matter realizes excellent image quality and has strong fastness property.

[5-6] Process Performed by First Manufacturing Apparatus:

[5-6-1] Position Detection and Precut Process of Recording Medium:

The portion 8 to be detected illustrated in FIG. 6 detects the position of the recording medium 1 and controls each portion based on the result of the detection in order to synchronize the recording medium 1 and the recording portion 6. A reflection- or transmission-type optical sensor is used in the detection of the medium. The portion 8 to be detected may be recorded or processed on the recording medium 1, or may be formed by precut, in advance. At this time, when the ink-receiving layer portion of the recording medium 1 is made thick, a peeling step after retransfer may become constitutionally and temporally difficult. Accordingly, the portion may be processed, or may be formed by a media processing portion, in advance as in the portion to be detected.

Figure 13:
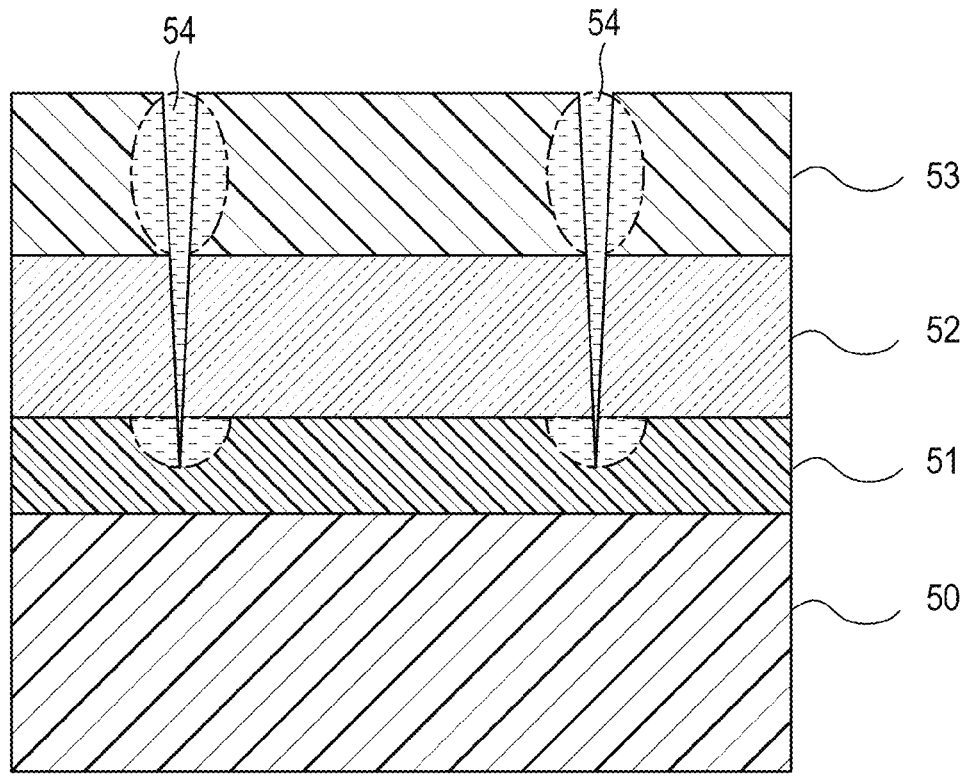
FIG. 13 is a cross-sectional view illustrating a state in which an ink penetrates a conventional precut-processed portion.
Figure 21:
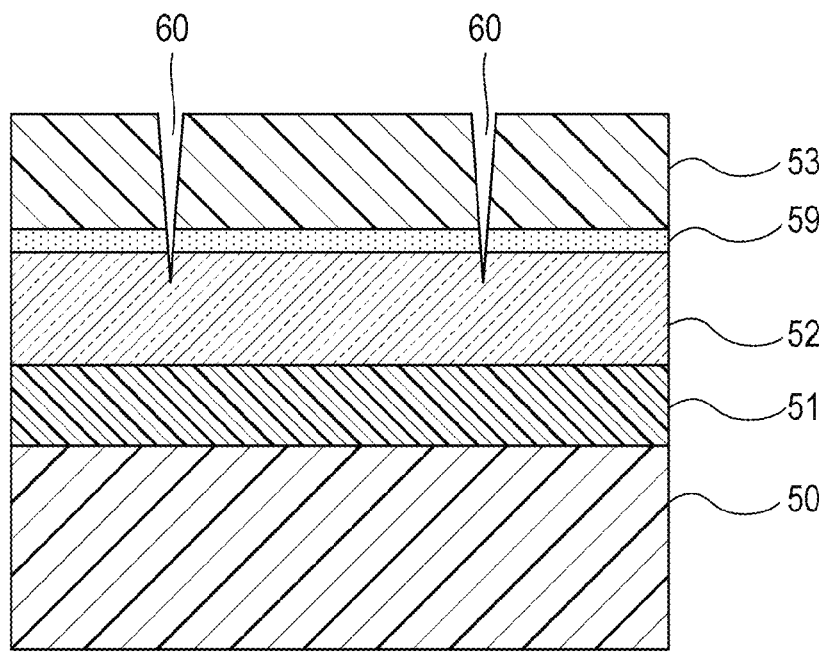
FIG. 21 is a cross-sectional view illustrating a state in which the recording medium illustrated in FIG. 20 is subjected to a precut process.
Figure 22:
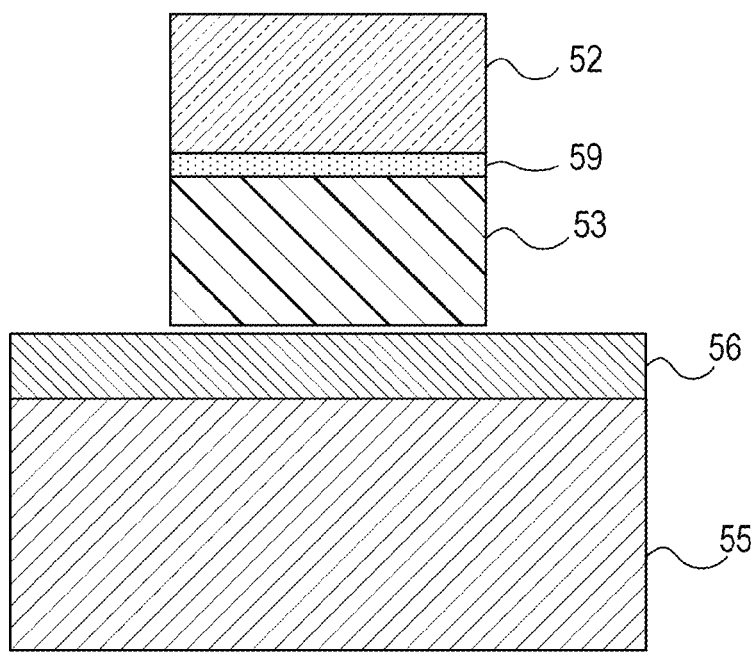
FIG. 22 is a cross-sectional view illustrating the construction of a recorded matter manufactured using an anchor layer.

[5-6-2] Cut Process:

The recording medium is subjected to a cut process (hereinafter referred to as "precut process") for making notches 54 or notches 60 into part of the ink-receiving layer 53 and the transparent sheet 52 or part of the ink-receiving layer 53, the anchor layer 59, and the transparent sheet 52 as illustrated in FIG. 13 or FIG. 21 as required. Accordingly, when the recording medium 1 is adhered to the image support 55 including the primer layer 56, the transparent sheet 52 is cut by using the notches 54 formed by the precut process as boundaries, and a portion having recorded thereon an image (image-recorded region) is covered with the transparent sheet 52. Sufficient durability is imparted to the image because the transparent sheet 52 functions as a strong protective layer having a uniform thickness. In addition, the protective layer can be easily transferred onto the image with good accuracy because the transparent sheet 52 is beautifully cut at the portions of the notches 54 or notches 60 formed by the precut process after the recording medium 1 has been released as illustrated in each of FIG. 12 and FIG. 22.

In addition, a sharp and accurate edge shape can be obtained by performing the precut process to form the notches 54 or the notches 60. Thus, the position of a portion such as a sign panel, IC chip, or magnetic stripe of the image support, or of a design portion such as a logo or hologram recorded on the image support in advance, and the position of the partially void portion can be registered with each other, and the resultant patch can be adhered to the image support. Thus, in the portion such as a sign panel, an IC chip, or a magnetic stripe, a reduction in performance in a post-process for the portion can be prevented. In addition, when an image is formed in the design portion such as a logo or a hologram, the transparency of the design portion is impaired (its opacity rises) and its quality reduces, and hence the portion needs to avoid an image formed portion. In this case, the avoidance can be accurately performed. It should be noted that the sign panel portion is a portion where handwriting is performed with a writing instrument such as a ball-point pen, numbering is performed with a stamp ink, or sealing is performed with a vermillion ink pad or a stamp ink.

Figure 11:
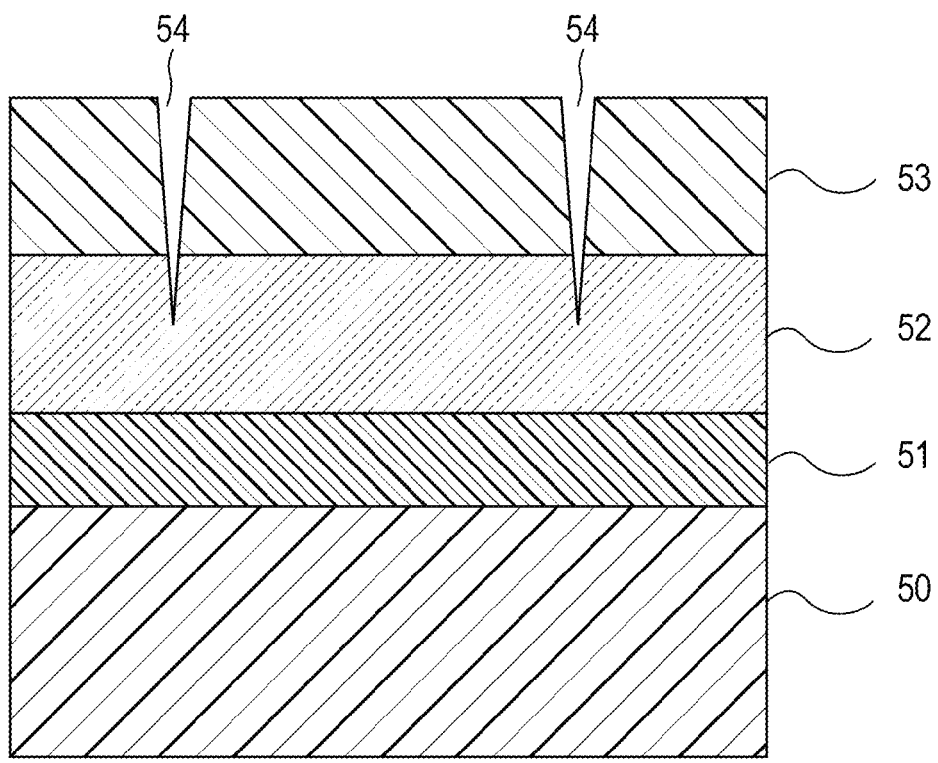
FIG. 11 is a cross-sectional view illustrating a state in which the recording medium illustrated in FIG. 1 is subjected to a precut process.

The notches 54 or notches 60 formed by the precut process are made into part of the ink-receiving layer 53 and the transparent sheet 52 as illustrated in FIG. 11, or part of the ink-receiving layer 53, the anchor layer 59, and the transparent sheet 52 as illustrated in FIG. 21, and the precut process is different from a cut process of making notches into a position as far as the releasing layer 51.

In the first manufacturing apparatus, recording is performed by an inkjet system. Accordingly, the ink-receiving layer 53 needs to absorb an ink and the thickness of the ink-receiving layer needs to be increased in order that its absorbability may be secured. In particular, when the ink-receiving layer 53 is formed of a gap-absorption-type layer, and a resin or the like having adhesion property is not incorporated into the ink-receiving layer or the coating weight thereof is 25 g/m$^2$ or more, an image-forming region may accidentally peel from the recording medium owing to the thickness of the ink-receiving layer. Accordingly, the precut process is preferably performed in order to prevent the peeling of the image-forming region.

Figure 14:
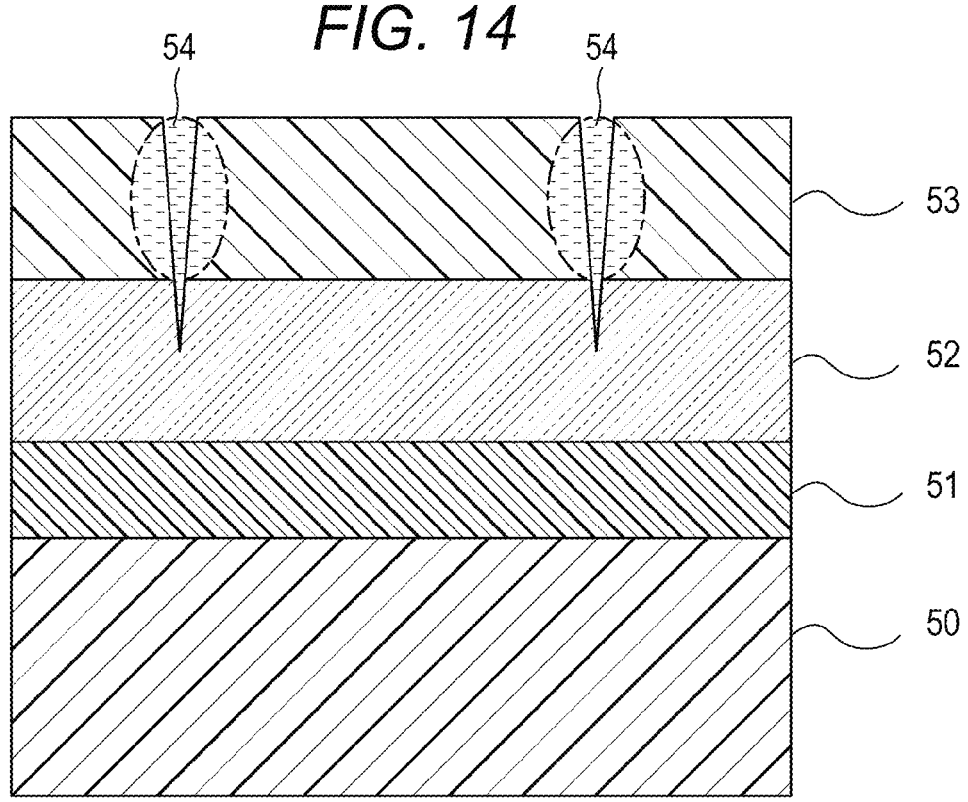
FIG. 14 is a cross-sectional view illustrating a state in which an ink penetrates a precut-processed portion.
Figure 23:
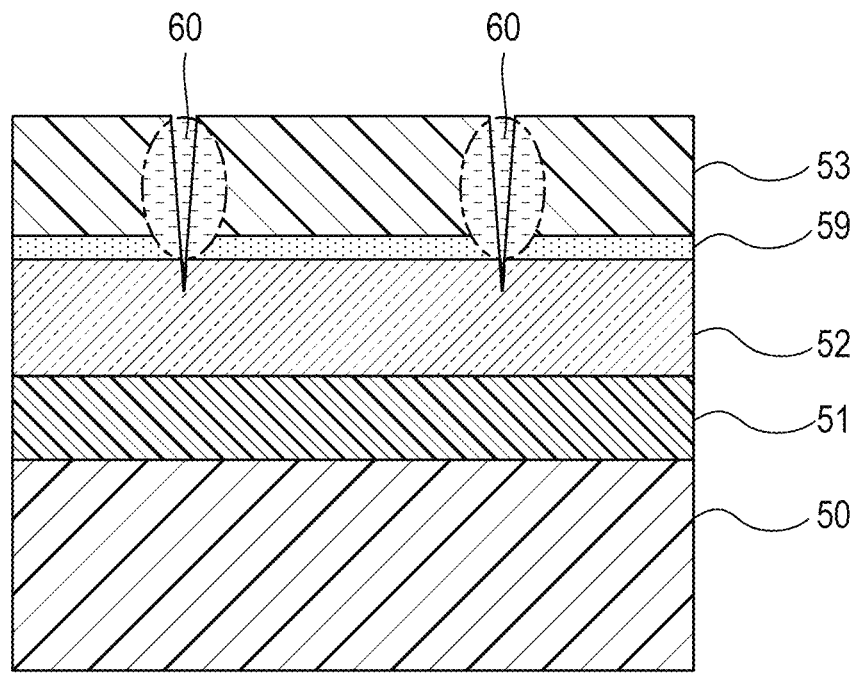
FIG. 23 is a cross-sectional view illustrating a state in which an ink penetrates a precut-processed portion including an anchor layer.

In addition, when a cut process is performed on a position as far as the releasing layer 51, in the first manufacturing apparatus that records an image by the inkjet system, in the case where an ink is ejected into a cut portion, the ink is absorbed by the releasing layer 51 as illustrated in FIG. 13, which causes a reduction in quality of a recorded image. In contrast, as illustrated in FIG. 14 or FIG. 23, even when recording on a portion subjected to the precut process is performed, an ink is merely absorbed by the ink-receiving layer 53 in a proper manner and is not absorbed by the transparent sheet 52, and hence a good recorded image can be obtained. Accordingly, the precut process of making the notches 54 into part of the ink-receiving layer 53 and the transparent sheet 52 or part of the ink-receiving layer, the anchor layer, and the transparent sheet is preferably performed.

In order that the image peeling may be prevented, the recording medium 1 in a printer before retransfer is preferably conveyed in a smooth state without having a curvature. Thus, the image-forming portion does not accidentally peel from the recording medium during the running of the printer, a recorded matter excellent in various kinds of durability of a transferred image even under a severe use condition can be produced, and the transparent sheet 52 can be easily retransferred onto the image on the image support with good accuracy and without faulty transfer.

[5-6-3] Recording Process:

An inkjet system image-forming apparatus (inkjet printer) that ejects an ink (ink droplets) from a plurality of nozzles formed in a recording head onto a recording medium to form an image has been widely used. The following technology has been known as a technology for ejecting the ink droplets from the nozzles: a thermal energy according to a driving pulse is supplied to the ink in the nozzles to form air bubbles by film boiling, and the ink droplets are ejected from the nozzles with the air bubbles. A large number of ink droplets according to an image to be formed are ejected from the nozzles onto the recording medium, whereby the image is formed on the recording medium.

Available as the inkjet printer is a full-line printer using a line head in which a large number of multi-nozzle heads in each of which a plurality of nozzles each formed of, for example, an ink ejection port and an ink flow path are integrated are arrayed so as to be perpendicular to the conveying direction of a recording medium for increasing an image recording speed. In the full-line printer, the ink droplets are simultaneously ejected from the ink ejection ports of the plurality of nozzles according to the conveyance of the recording medium to record an image. Accordingly, the full-line inkjet printer can satisfy the following requirement which a current printer needs to satisfy: a high-quality and high-resolution image should be formed at a high speed. In addition, the inkjet printer has an advantage in that extremely stable image recording can be performed because each recording head and the recording medium are out of contact with each other at the time of the image recording. A recording head having an ink ejection amount of preferably 20 picoliters (pl) or less, more preferably 10 pl or less, still more preferably 5 pl or less is utilized from the viewpoint of properly managing the water content of the ink at the time of retransfer to be described later. As the ejection amount reduces, the spread of the ink in the ink-receiving layer is suppressed, and hence an image that is denser and has a more sufficient density can be formed, and the thickness of an ink layer can be suppressed, though the preferred ejection amount varies depending on the concentration of a coloring material. Therefore, an ejection amount of 20 pl or more may make it difficult to control the water content of the ink in the step of adhering the image support and the recording medium.

The guide plate 28 is present in the path along which the recording medium 1 is conveyed to the recording portion 6 while being sandwiched between the grip roller 3 and the nip roller 2, and the recording medium 1 passes, and is guided by, the top of the guide plate 28 to enter the recording portion 6. The recording portion 6 uses four recording heads formed of K, C, M, and Y recording heads as main constituent members. The four recording heads eject inks according to image data and eject ink droplets onto the ink-receiving layer provided in the recording medium 1 to form an image.

A dye ink and a pigment ink can each be suitably used as the ink. However, in order that adhesion property between the image support 55 and the ink-receiving layer 53 at the time of the retransfer may be improved, the ink is desirably brought into a dry state (state in which the water or solvent in the ink does not remain on a recording surface) to prevent faulty adhesion due to the evaporation of the water from the recording surface after recording, and from the viewpoint of preventing the movement (migration) of an aqueous ink due to the water or solvent remaining in the ink, the pigment ink is preferably used. Further, the pigment ink is preferably used because the ink can impart light resistance to a printed image.

Figure 25:
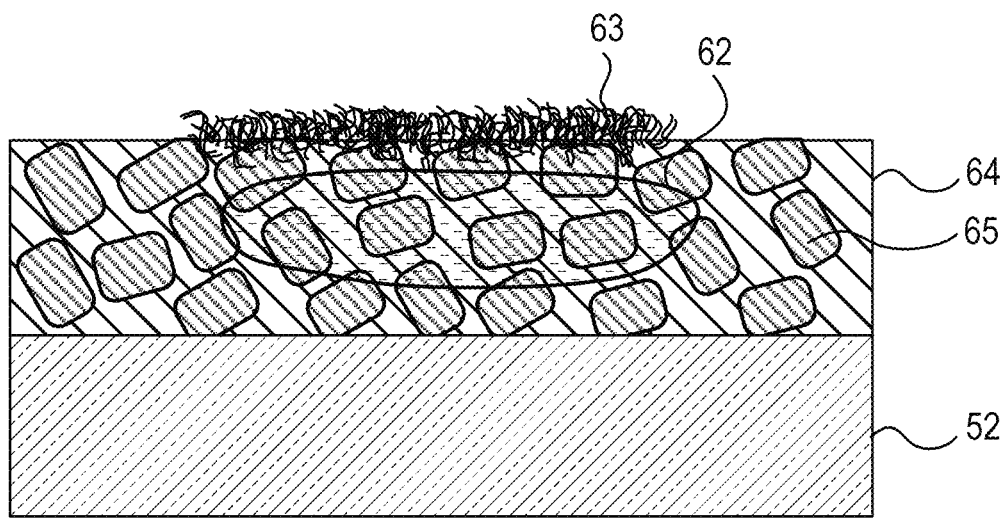
FIG. 25 is a cross-sectional view illustrating a state in which a pigment ink is fixed to a gap-absorption-type ink-receiving layer.
Figure 26:
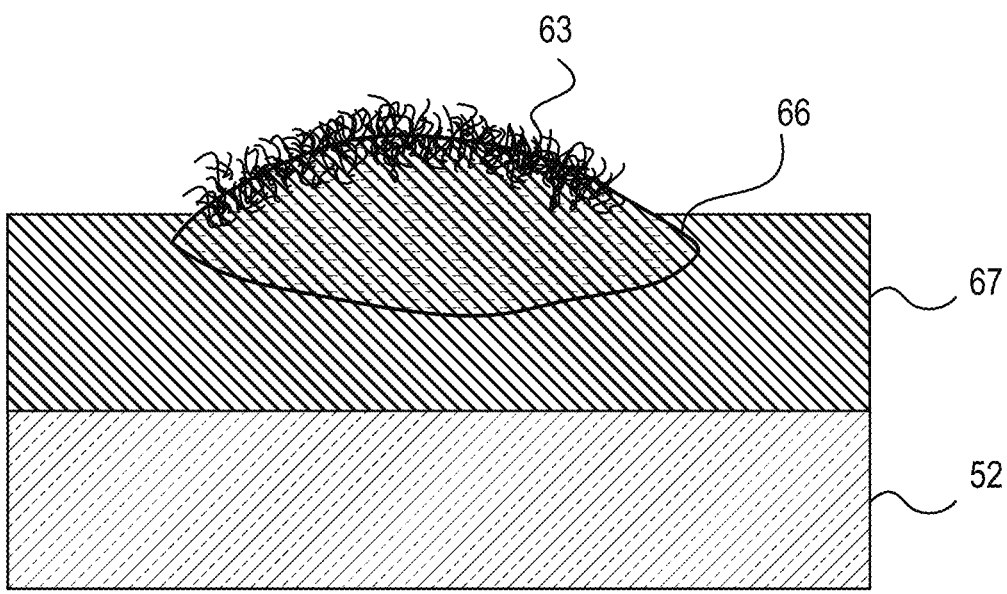
FIG. 26 is a cross-sectional view illustrating the swollen state of a swelling-absorption-type ink-receiving layer after the fixation of an ink to the ink-receiving layer.

The foregoing contents are described in more detail. In a gap-absorption-type ink-receiving layer, as illustrated in FIG. 25, a pigment component 63 in the pigment ink has a large particle diameter, and hence the pigment ink does not permeate the insides of pores constituted of pigment particles 65 forming the ink-receiving layer and fixes on the recording surface of an ink-receiving layer 64. Further, unlike a swelling-type ink-receiving layer, the ink-receiving layer is kept smooth without swelling. On the other hand, when a swelling-absorption-type ink-receiving layer to be described later is used, as illustrated in FIG. 26, an ink-receiving layer 67 swells owing to the water in the ink to cause irregularities on the surface of an ink-receiving layer 66, which reduces the adhesion property of the image support 55 with the ink-receiving layer. In addition, the water or solvent remaining in the ink remains on the surface of the ink-receiving layer 66, and hence adhesiveness between the image support and the ink-receiving layer may be insufficient owing to the evaporation of the remaining water and solvent in the adhesion step.

In addition, while the pigment component in the pigment ink fixes on the surface of the ink-receiving layer 53, water and solvent components 62 in the ink permeate the inside of the ink-receiving layer to separate (solid-liquid separation) from the pigment component 63 on the surface. Thus, a pigment surface is in a dry state at the time of the retransfer, and hence the faulty adhesion due to the evaporation of the water can be prevented and the adhesion property can be improved. In addition, the remaining water and solvent components 62 remain in the ink-receiving layer. Accordingly, the pigment component is not brought into contact with the remaining water and solvent components 62 again, and hence the movement (migration) of the ink can be prevented.

In addition, a resin dispersion-type pigment component obtained by covering the periphery of a coloring material pigment with a resin is preferably used as the pigment component in the pigment ink. The use of the resin dispersion-type pigment can increase a binding force between pigment particles after the solid-liquid separation. Further, the use can increase the binding force of each particle with the primer layer at the time of the retransfer. Thus, the following state is established: water on the pigment surface is substantially blocked from the water of a lower layer in the ink-receiving layer, and is substantially blocked from replenishment with water from the lower layer by a pigment film. Accordingly, when the amount of the water on the surface of the pigment film is small, the ink can be sufficiently dried by natural drying. The resin with which such pigment is covered is preferably a (meth)acrylate-based copolymer having an acid value of 100 mgKOH/g or more and 160 mgKOH/g or less because the copolymer has relative hydrophobicity to improve the fixability of the ink. When the acid value of the (meth)acrylate-based copolymer exceeds 160 mgKOH/g, the following tendency is observed: the hydrophilicity of the pigment component of an image (printed article) to be recorded strengthens and hence the exudation resistance of the ink reduces. On the other hand, when the acid value of the (meth)acrylate-based copolymer is less than 100 mgKOH/g, its ejection stability tends to reduce in the case where the ink is used in an inkjet recording apparatus that ejects the ink by a thermal system. By the foregoing reasons, the pigment ink fixes at a high speed and is hence optimum for high-speed recording.

Figure 27:
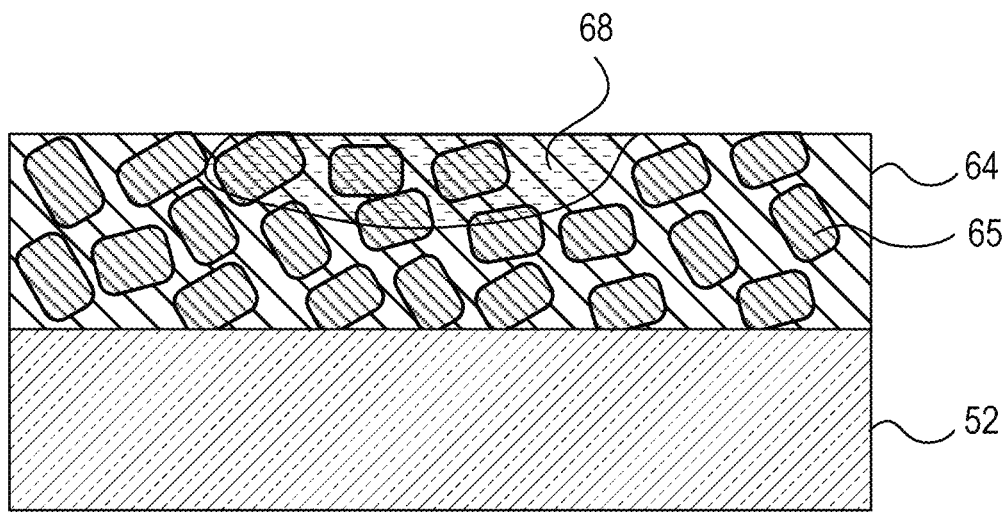
FIG. 27 is a cross-sectional view illustrating a state in which a dye ink is fixed to the gap-absorption-type ink-receiving layer.
Figure 28:
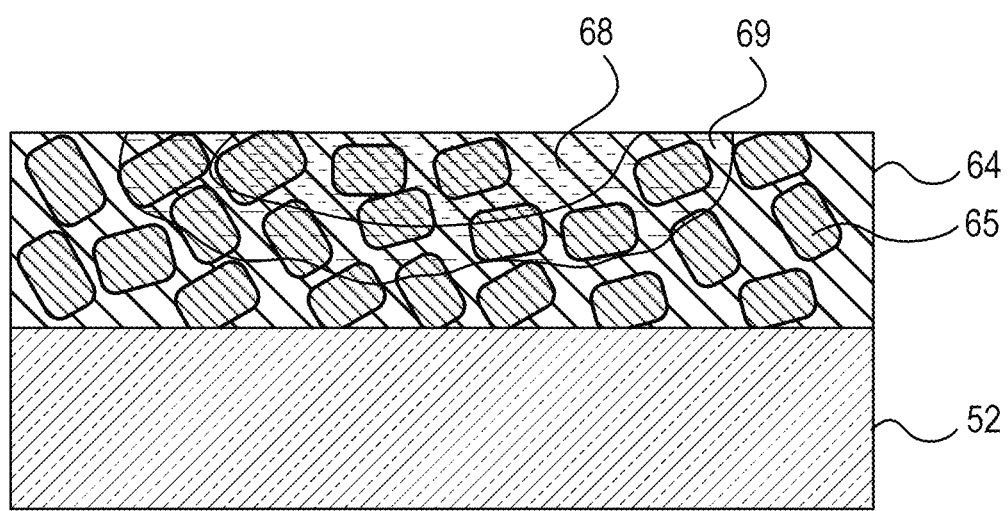
FIG. 28 is a cross-sectional view illustrating a state in which the dye ink migrates after the fixation of the dye ink to the gap-absorption-type ink-receiving layer.

On the other hand, as illustrated in FIG. 27, a dye component 68, and water and solvent of the dye ink permeate the insides of the pores constituted of the pigment particles 65 forming the ink-receiving layer to fix the ink, and hence such solid-liquid separation as described in the pigment ink does not occur in the ink-receiving layer. Accordingly, when the dye component 68 is brought into contact with the remaining water and solvent components again after the retransfer, the dye dissolves in the water and solvent components again, and hence such a movement (migration) that the dye component 68 becomes a dye component 69 as illustrated in FIG. 28 occurs. Accordingly, the dye ink is not preferred.

[5-6-4] Water Evaporation Control:

When the ink remains on the surface of the receiving layer containing the ink at the time of the retransfer, adhesiveness between the layer and the image support becomes insufficient. Inconvenience such as the insufficiency of the adhesiveness or partial remaining of air bubbles in the receiving layer may occur owing to abrupt evaporation of the ink component or ink remaining on the surface layer of the receiving layer by heating at the time of the retransfer, and hence predrying in which effective contrivance is made on a conveying path for a transfer sheet after inkjet recording for the retransfer and before the retransfer may be needed. Natural drying may be promoted with a construction in which a special drying unit such as a heater is not provided and a conveying path having a sufficient length is provided before the retransfer. In addition, a unit for controlling an airflow or exhaust in the apparatus due to the ink component that evaporated at this time may be needed. When the reverse image 9 recorded on the ink-receiving layer on the recording medium 1 is passed through a gap between the drying portion 7 and the guide plate 28 by the recording portion 6 as illustrated in FIG. 6, water as a main component of the ink in the image recorded on the receiving layer and a slight amount of a volatile solvent component in the ink are evaporated by the drying portion 7 having an evaporating function based on a halogen or a heat source equivalent thereto, or wind, or a combination of the two, and an airflow and exhaust are controlled with the fan 10 in order that the condensation or the like of the evaporated gas may be prevented from occurring in the apparatus. Combined use of the control of the airflow may improve the saturated vapor pressure of the surface of the ink-receiving layer to promote the drying.

The water content (the total amount of, for example, water and a nonvolatile solvent excluding a coloring material) of the ink in the ink-receiving layer is controlled to preferably 70% or less, more preferably 50% or less with respect to the total ejection amount of the ink at the time of the adhesion step by the water control. The case where the remaining water content of the ink is 70% or more is not preferred because inconvenience such as the insufficiency of the adhesiveness or partial remaining of air bubbles in the receiving layer may occur owing to abrupt evaporation of the ink component or ink remaining on the surface layer of the ink-receiving layer, though the preferred value varies depending on the thickness of the ink-receiving layer. In addition, the total ejection amount of the ink can be set to a proper ejection amount through, for example, the limitation of the ejection amount achieved by, for example, thinning out the number of dots at the time of image formation in advance so that the water control is properly performed, though the proper value varies depending on the ejection amount of a head.

[5-6-5] Adhesion Step:

As illustrated in FIG. 6, the image is formed on the receiving layer provided on the recording medium 1 by the recording portion 6, and then the recording medium 1 is guided by the top of the guide plate 28 to move toward the adhesion portion 29 constituted of the two heat rollers 21, 22. In the adhesion portion 29, the image support 11 is placed in the form of a flat sheet on the image support supply portion 12, and after the primer has been transferred onto the image support 11 by the transfer portion 13, the position of the resultant is corrected by the registration guide 14 and supplied according to the conveyance of the recording medium 1. The image support supply portion 12 supplies the image support from a lower portion thereof in order to prevent the adhesion of dirt to the transfer surface of the image support or its contamination from a rubber roll at the time of pickup.

The transfer of the primer is performed as follows: the image supports 11 are supplied one by one into the transfer portion 13, and the primer is supplied from the supply roll 15 (primer supply roll), passed through a gap between the thermal head 30 and the image support 11, rolled on the rolling-up roll 17 (primer rolling-up roll) side via the guide rolls 16, and conveyed. An energy is applied to the thermal head 30 according to a heat capacity that varies depending on, for example, the thickness and material of the primer to cause the head to generate heat, and the primer is caused to migrate toward the image support 11 to form an adhesion layer. Selective heating of the thermal head 30 enables such selective primer transfer that no primer transfer is performed on a special portion where one does not wish to perform surface coating such as an IC portion. However, in an apparatus assuming that a primer layer is applied to an entire surface, primer transfer can be performed with a heating unit such as an inexpensive heat roller.

The ink-receiving layer of the recording medium 1 having formed thereon the image and the primer of the image support 11 are superimposed, conveyed to a gap between the heat rollers 21, 22, and heated, whereby the image support 11, the ink-receiving layer having formed thereon the image, and the transparent sheet 23 are adhered through the primer. After that, the base material sheet provided in the recording medium 1 is released from the recording medium 1. Thus, a state in which the ink-receiving layer having formed thereon the image and the transparent sheet are adhered onto the image support 11 is established. In other words, on the image support 11, the transparent sheet 23 is positioned in the uppermost layer to serve as a protective film and the image is formed below the protective film.

In addition, the retransfer is performed at a temperature in the range of from not less than the Tg of the primer at which the adhesion of the primer is expressed to not more than the evaporation temperature of the ink because the occurrence of abrupt evaporation of the water in the ink at the time of the retransfer causes faulty adhesion between the recording medium and the image support, or partial remaining of air bubbles in the receiving layer. In the heating of the ink-receiving layer at the time of the retransfer, which is performed by thermal transfer not from the side of a thick image support such as a plastic card but mainly from the base material sheet side of the recording medium, the maximum temperature which the ink-receiving layer reaches at the time of the adhesion step has only to be controlled so as not to exceed the evaporation temperature of the water as a main component of the ink. In other words, the surface temperature of each heat roller upon adhesion of the recording medium 1 and the image support 11 has only to be such a temperature that air bubbles are not formed between the recording medium 1 and the image support 11 by the evaporation of the water. In addition, when the conveying speed or the like of the recording medium and the image support is so high that a time period for heating with a heat source cannot be sufficiently secured, a temperature difference may occur between the heat source and the receiving portion, and hence the surface temperature of the heat roller may be controlled so as to be higher than the ordinary evaporation temperature of water, specifically to 100° C. to 180° C. In addition, heating in a closed space causes an increase in boiling point due to an increase in pressure, and hence the evaporation temperature of water increases in the ink-receiving layer sandwiched between the primer layer and the transparent sheet layer. Accordingly, the surface temperature may be controlled so as to be an even higher temperature in consideration of the adhesiveness and foil-cutting property.

[5-6-6] Preheating:

When the primer layer 18 is transferred onto a card side in advance and adhered while being positioned with the recording medium 1 having recorded thereon the image as illustrated in FIG. 6, the adhesion can be performed by performing heating and melting only on at least the surface layer of the primer layer 18 in some cases. To this end, the surface of a card or the like including the primer layer and the image support such as paper having transferred thereon the layer is moderately heated by the preheating portion 19 before the adhesion of the recording medium 1. Thus, an excessive increase in temperature due to the heating of the ink-receiving layer on the recording medium 1 can be controlled. In addition, the fan 20 controls an airflow and exhaust due to the solvent that evaporated from the primer layer at the time of the heating.

[5-6-7] Peeling Process:

As illustrated in FIG. 6, the base material sheet 50 of the recording medium 1 that has passed the adhesion portion 29 is rolled on the take-up roll 24 side in a state in which the image-forming region separated by the precut process is released, and the image supports 11 having formed thereon images are conveyed to the discharge portion 26 and accumulated one by one.

In the manufacturing apparatus 25 (recorded matter-manufacturing apparatus) illustrated in FIG. 6, a conveying angle θ of the recording medium 1 is preferably 0 to 165°, more preferably 0 to 90°. Setting the conveying angle θ within the range can prevent accidental peeling or turning of a patch portion of the recording medium 1 separated by the precut process in the precut processing portion 5 during the running of a printer. The conveying angle θ in the case of FIG. 6 is an angle formed between a conveying path from the recording portion 6 to the adhesion portion 29, and a conveying path from the heat rollers 21, 22 to the take-up roll 24, but is not limited thereto.

FIG. 11 illustrates the construction of a recorded matter (final recording medium), and the recorded matter 73 has the transparent sheet 52 adhered to sandwich the ink-receiving layer 53 as illustrated in FIG. 11, and hence the recorded matter brings together excellent image quality and strong fastness property.

[6] Second Manufacturing Apparatus:

Next, a second construction example of the manufacturing apparatus for manufacturing the recorded matter of the present invention (hereinafter sometimes referred to as "second manufacturing apparatus") is described.

Figure 16:
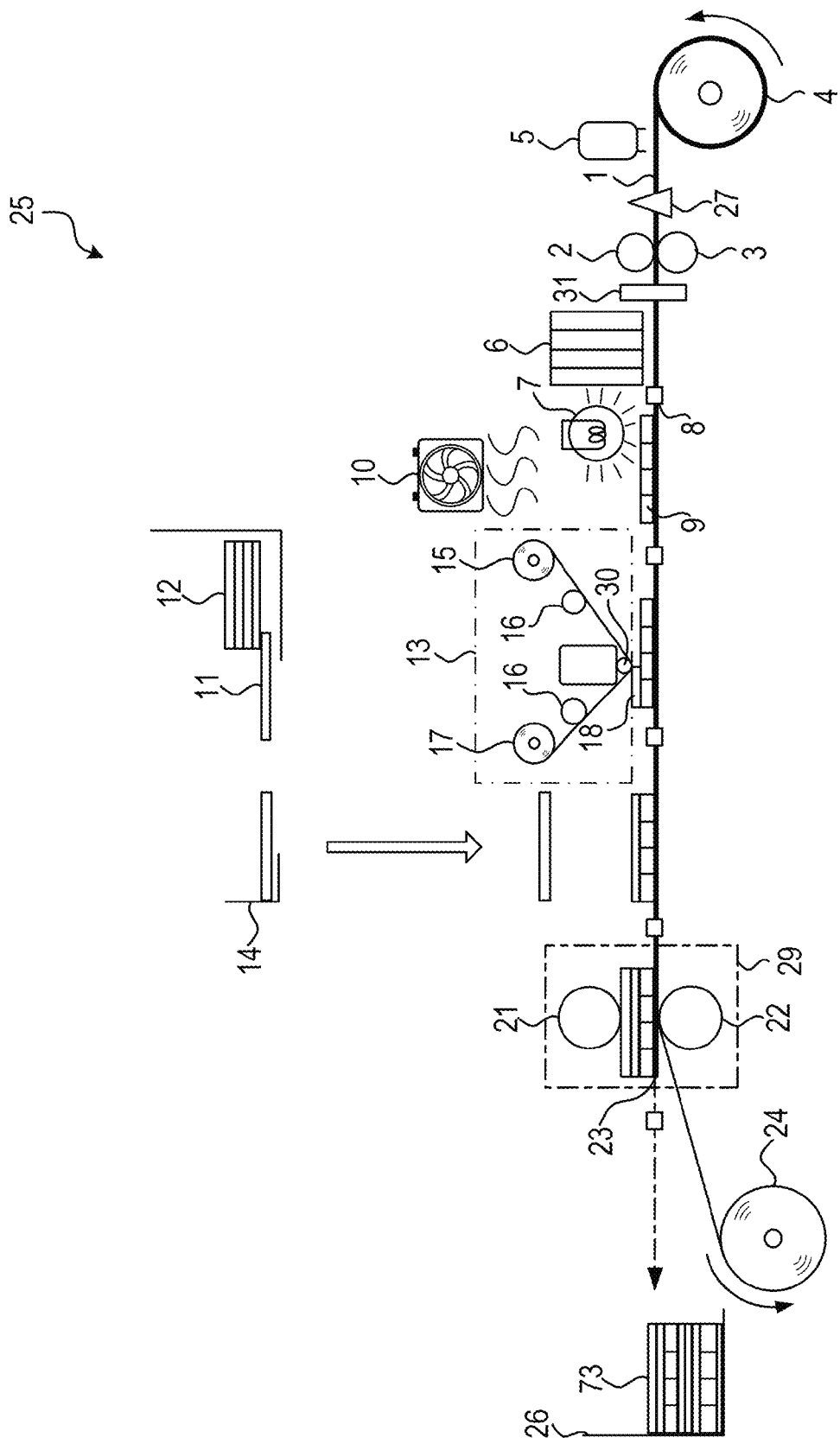
FIG. 16 is a schematic view illustrating the entire construction of a second manufacturing apparatus.

FIG. 16 is a schematic view illustrating the entire construction of the second manufacturing apparatus 25. The manufacturing apparatus 25 includes: the supply portion 4 for supplying the recording medium 1 rolled in a roll shape to a conveying path; and the recording portion 6 for directly ejecting an aqueous ink onto the recording medium 1 supplied to the conveying path to perform recording. Further, the manufacturing apparatus 25 includes: the drying portion 7 for evaporating a solvent in the reverse image 9 recorded on the recording medium 1 to improve its adhesiveness with the image support 11; the fan 10 for preventing condensation in the apparatus due to evaporated water; the recording medium 1 having recorded thereon the image by the recording portion; and the image support supply portion 12. Further, the manufacturing apparatus 25 includes, on the conveying path for the recording medium 1, the transfer portion 13 for transferring a primer for adhering the image support 11 positioned in the registration guide 14 to the recording medium 1. This construction is a main difference from the first manufacturing apparatus. The description of portions common to the first manufacturing apparatus is omitted because the manufacturing apparatus has the same apparatus and same control system construction as those of the first manufacturing apparatus. In addition, the manufacturing apparatus 25 includes: the adhesion portion 29 for heating the primer portion transferred onto the recording medium 1 by the transfer portion 13 to adhere the transparent sheet 52 including an ink-receiving layer having recorded thereon the image and the image support 11 to each other; and the discharge portion 26 in which the image support 11 having formed thereon the image is discharged and accumulated. In addition, water evaporation control and precut conditions are the same as those in the first manufacturing apparatus, and with regard to conditions for the adhesion of the recording medium 1, the heating needs to be performed for a longer time period than that in the first manufacturing apparatus because the recording medium 1 becomes thicker as a result of the transfer of the primer.

Figure 18:
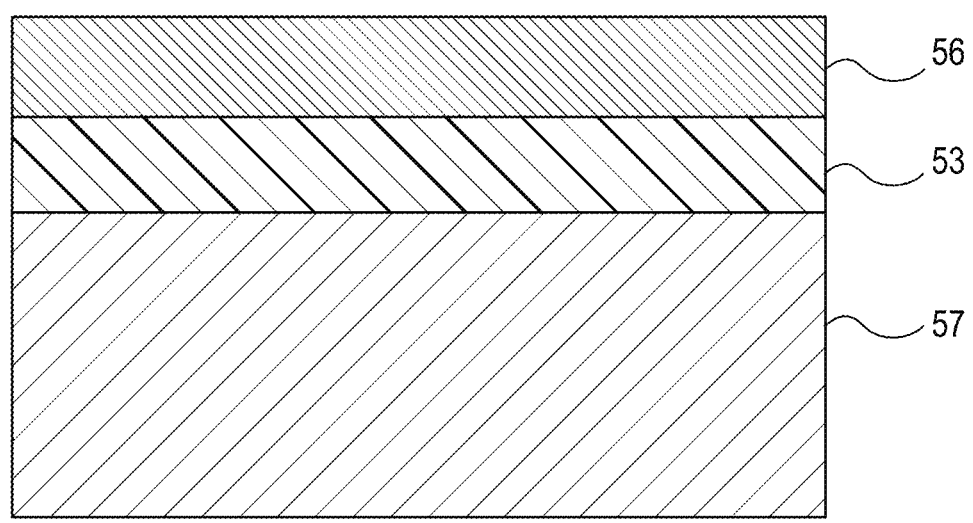
FIG. 18 is a cross-sectional view illustrating a state in which a primer layer is provided on a base material sheet in a third manufacturing apparatus.

The second manufacturing apparatus directly transfers the primer onto the recording medium 1. As a result, a path up to the retransfer of the recording medium 1 supplied from the supply portion onto the image support 11 and the discharge of the resultant is constituted in a serial manner and hence can be simplified. Accordingly, an increase in speed of the manufacture of a recorded matter can be achieved. It should be noted that FIG. 18 is a schematic view of a primer layer transferred by the primer transfer portion 13, and the primer layer 56 is further transferred onto the upper surface of the ink-receiving layer 53 provided on a base material sheet 57. In addition, the same sheet as the base material sheet 50 used in the first manufacturing apparatus can be used as the base material sheet 57 on which the primer layer is to be provided.

Figure 17A:
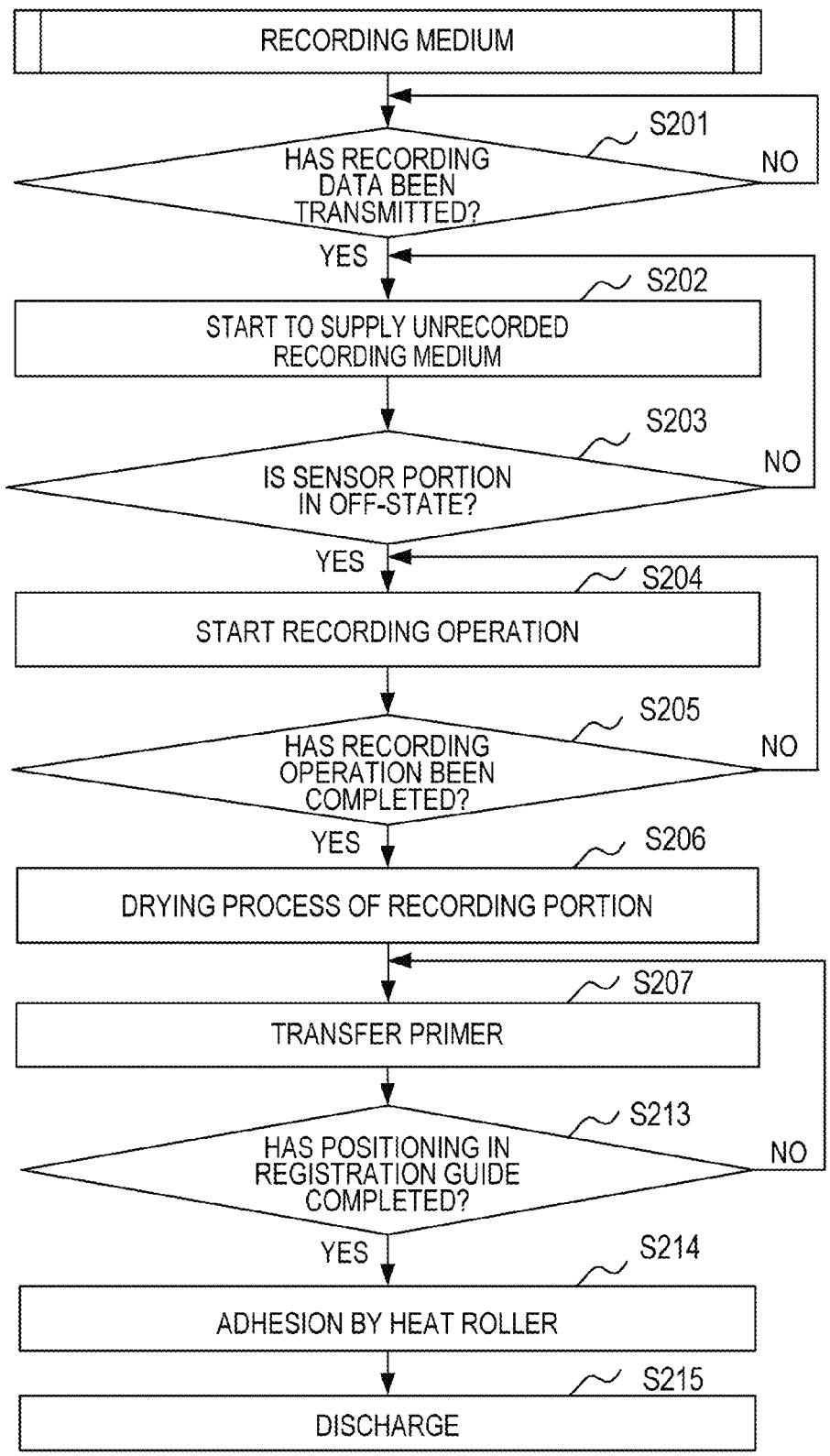

Next, operations in the second manufacturing apparatus are described based on the flow charts of FIGS. 17A and 17B, and FIG. 16. The flow charts are performed by a CPU.

The operation of conveying the unrecorded recording medium 1 supplied from the supply portion 4 is started after recording data has been transmitted through a network or various ports by the controller 41 illustrated in FIG. 8 (S201 and S202). Here, when the sensor portion 31 detects the portion 8 to be detected cut into the recording medium 1 by the precut processing portion 5 (YES of S203), the operation of recording on the recording medium 1 by the recording portion 6, a drying process by the drying portion 7, and the adhesion (retransfer) of the recording medium 1 to the image support 11 by the adhesion portion 29 (retransfer portion) are controlled by being synchronized from their starts to ends (S204 and S205). Here, a product subjected to a cut process in advance in a portion except the precut processing portion 5 may be used as the portion 8 to be detected.

After excess water remaining on the recording medium 1 on which the image has been recorded by the recording portion 6 has been evaporated by the drying portion 7, the primer supplied in a sheet shape is transferred onto the image support 11 by the thermal head 30 of the transfer portion 13 placed in the conveying path for the recording medium 1 (S206 and S207).

Meanwhile, the image support 11 supplied from the image support supply portion 12 is mounted on the recording medium 1 in synchronization with positioning with the recording medium 1 in the registration guide (S208 to S212). After that, a YES judgment is made at Step S213, and the image support 11 and the recording medium are adhered by the heat rollers of the adhesion portion 29 through the primer on the recording medium (S214). Further, the base material sheet of the recording medium is released by using a portion precut by the precut processing portion 5 as a starting point, and the final recorded matter is mounted on the discharge portion (S215).

[7] Third Manufacturing Apparatus:

A third manufacturing apparatus has the same construction as the construction of the first manufacturing apparatus illustrated in FIG. 6. However, when the fixability of an ink is needed, in the case where a recording speed is increased, in order that the absorption speed of the ink ejected onto an ink gap-type receiving layer on the recording medium 1 may be increased, a primer (resin) is transferred onto the image support 11 and a resin for adhesion in the ink-receiving layer is removed. Thus, an increase in absorption speed of the ink can be achieved.

[8] Fourth Manufacturing Apparatus:

Next, a fourth manufacturing apparatus is described. The fourth manufacturing apparatus has the same construction as that of the second manufacturing apparatus illustrated in FIG. 16. In the fourth manufacturing apparatus, however, the ink-receiving layer of the recording medium 1 formed of a gap-type receiving layer is thinned and an image is recorded on the thinned ink-receiving layer 53 by the recording portion 6, and then a primer is directly transferred onto the recording medium 1 to reduce a thickness to be adhered in an adhesion step. Thus, there is no need to perform processing such as precut, and hence an improvement in productivity and a reduction in apparatus cost can be achieved. That is, in the fourth manufacturing apparatus, after the recording medium 1 has been adhered to the image support 11 through heating in the adhesion portion 29, an end portion of the image support 11 quickly peels from the recording medium 1, and thus the image is formed. It should be noted that the coating weight of the ink-receiving layer is preferably set to a coating weight of 20 g/m² or more and 25 g/m² or less.

[9] Fifth Manufacturing Apparatus:

Although a fifth manufacturing apparatus has the same construction as that of the second manufacturing apparatus illustrated in FIG. 16, the apparatus has a swelling-type receiving layer as an ink-receiving layer. The swelling-type receiving layer is suitable for high-speed recording because the layer quickly absorbs an ink even when the layer is thin, and because even when precut is not performed, an end portion of the image support 11 quickly peels from the recording medium 1, and thus an image is formed; provided that the layer has irregularities on its surface and hence the layer is provided with smoothness by absorbing the irregularities with the thickness of a primer.

Next, a swelling-absorption-type ink-receiving layer is described. The swelling-absorption-type ink-receiving layer is constituted of, for example, a water-soluble resin that absorbs an ink. Examples of the water-soluble resin include: cellulose derivatives such as gelatin, methylcellulose, cellulose acetate, and hydroxypropyl methylcellulose; agar; casein; starch; and polyvinyl alcohol. Of those, gelatin is preferably used because gelatin improves the absorbability of the water or solvent used in the ink.

Although any gelatin using the collagen of an animal as a raw material can be used as gelatin, gelatin obtained from collagen using a pig skin, cowhide, or a beef bone as a raw material is preferred. Further, although the kind of gelatin is not particularly limited, one kind of lime-processed gelatin, acid-processed gelatin, and derivative gelatin (described in "Derivative Gelatin") can be used alone, or two or more kinds thereof can be used in combination.

In the fifth manufacturing apparatus, as the water-soluble resin, in addition to gelatin, cellulose derivatives, and polyvinyl alcohol described above, for example, the following resins can be used in combination: a polyvinylpyrrolidone, a polymer containing an acryl group such as polyacrylamide, polydimethyl acrylamide, polydimethylamino acrylate, or an acrylic acid-vinyl alcohol copolymer salt (see Japanese Patent Application Laid-Open No. 60-168651 and Japanese Patent Application Laid-Open No. 62-9988), starch, oxidized starch, carboxyl starch, dialdehyde starch, cationic starch, dextrin, gum arabic, casein, pullulan, dextran, a polyalkylene glycol such as polyethylene glycol or polypropylene glycol, and a synthetic polymer such as polyvinyl ether, polyglycerin, an alkyl maleate-vinyl ether copolymer, a maleic acid-N-vinylpyrrole copolymer, a styrene-maleic anhydride copolymer, or polyethylene imine.

In addition, as in the gap-absorption-type, a resin to be used in the primer layer 56 to be described later may be used in the ink-receiving layer 53 for the purpose of adjusting the film strength of the ink-receiving layer. It should be noted that when a resin having adhesion property is used in the ink-receiving layer, the temperature of preheating to be performed in water evaporation control is set to be not more than the Tg of the resin having adhesion property. The coating weight of the ink-receiving layer falls within the range of preferably from 5 to 20 g/m², more preferably from 10 to 15 g/m². Setting the amount within the range can maintain good ink absorbability.

The swelling absorption type is improved in releasability at the time of adhesion because its coating weight is smaller than that of the gap absorption type. However, the former requires a longer time period for the absorption of an ink than that of the latter, and hence the water and solvent of the ink are liable to remain on the surface of the ink-receiving layer 53. As a result, adhesiveness between the image support and the ink-receiving layer may be insufficient. Accordingly, when the image support and the ink-receiving layer are adhered, the ink-receiving layer is preferably used after the water evaporation control of the layer has been performed by performing preheating. In addition, when the swelling-absorption-type ink-receiving layer is used, a precut process may not be performed because the thickness of the ink-receiving layer can be reduced.

It should be noted that when the swelling-absorption-type ink-receiving layer is used, the thickness of an adhesion layer is preferably set to be larger than the thickness of the swelling-absorption-type ink-receiving layer, specifically about 2 to 3 times as large as the thickness of the ink-receiving layer because of the following reason: the ink-receiving layer swells as a result of the absorption of the ink to increase the thickness of the ink-receiving layer, and hence sufficient adhesion property needs to be secured by virtue of the thickness of the adhesion layer even when irregularities occur on the surface of the ink-receiving layer.

As described above, according to the first to fifth manufacturing apparatus, when a recording medium includes at least a transparent sheet and an ink-receiving layer on a base material, the control of the ink water content of the ink-receiving layer and temperature control at the time of adhesion are performed in the step of adhering the recording medium to an image support. Thus, an image-forming printer that improves adhesiveness between the transparent sheet of the recording medium and the image support, and is excellent in various kinds of durability such as weatherability, water resistance, chemical resistance, and gas resistance can be provided.

EXAMPLES

Hereinafter, the present invention is more specifically described by way of Examples and Comparative Examples. However, the present invention is not limited to only the constructions of Examples below. It should be noted that "part(s)" and "%" in the following description refer to "part(s) by mass" and "mass %", respectively, unless otherwise stated.

Example 1-1

A recording medium including a gap-absorption-type ink-receiving layer was manufactured by the following method.

[Preparation of Hydrated Alumina Dispersion Liquid]

20 Parts of a hydrated alumina A having a boehmite structure (pseudoboehmite structure) (trade name: "Disperal HP14," manufactured by Sasol) were added to pure water, and 0.4 part of acetic acid was further added to perform a peptization process. Thus, a hydrated alumina dispersion liquid was obtained. The average particle diameter of hydrated alumina fine particles in the hydrated alumina dispersion liquid was 140 nm. Next, 0.3 part of boric acid was added to the dispersion liquid to provide a boric acid-added hydrated alumina dispersion liquid.

[Preparation of Aqueous Solution of Polyvinyl Alcohol]

Separately from the foregoing, polyvinyl alcohol (trade name: "PVA235," manufactured by KURARAY CO., LTD.) was dissolved in ion-exchanged water to prepare an aqueous solution of the polyvinyl alcohol having a solid content of 8 mass %. It should be noted that the polyvinyl alcohol had a weight-average polymerization degree of 3,500 and a saponification degree of 87 to 89 mol %.

[Preparation of Coating Liquid for Forming Ink-Receiving Layer]

100 Parts by mass of the boric acid-added hydrated alumina dispersion liquid and 27.8 parts by mass of the aqueous solution of the polyvinyl alcohol were mixed with a static mixer to provide a coating liquid for forming an ink-receiving layer.

[Manufacture of Recording Medium]

Immediately after the mixing, the coating liquid was applied onto a transparent sheet in a layered sheet of the transparent sheet, a releasing layer, and a base material sheet, and was dried to manufacture a recording medium including a gap-absorption-type ink-receiving layer. The coating liquid was applied with a die coater at an application speed of 5 m/minute so that a coating weight after the drying became 15 g/m². A drying temperature was set to 600° C. It should be noted that a sheet available under the trade name "DCR-320" (manufactured by DYNIC CORPORATION) was used as the layered sheet. The layered sheet had a thickness of 15 μm and a total luminous transmittance of 100%.

The recording medium obtained as described above was subjected to 40% solid printing by the manufacturing apparatus 25 illustrated in FIG. 6 to provide a recording medium. After that, the recording medium was bonded to a card made of vinyl chloride (trade name: "C-4002," manufactured by Evolis) as an image support, and the base material sheet was released. Thus, a recorded matter of Example 1-1 was obtained.

Example 1-2

A recorded matter was obtained in the same manner as in Example 1-1 except that the kind of the polyvinyl alcohol was changed to polyvinyl alcohol available under the trade name "PVA245" (manufactured by KURARAY CO., LTD.) It should be noted that the polyvinyl alcohol is polyvinyl alcohol having a weight-average polymerization degree of 4,500 and a saponification degree of 87 to 89 mol %.

Example 1-3

A recorded matter was obtained in the same manner as in Example 1-1 except that the kind of the polyvinyl alcohol was changed to polyvinyl alcohol available under the trade name "PVA424" (manufactured by KURARAY CO., LTD.) It should be noted that the polyvinyl alcohol is polyvinyl alcohol having a weight-average polymerization degree of 2,400 and a saponification degree of 87 to 89 mol %.

Comparative Example 1-1

A recorded matter was obtained in the same manner as in Example 1-1 except that the kind of the polyvinyl alcohol was changed to polyvinyl alcohol available under the trade name "PVA117" (manufactured by KURARAY CO., LTD.) It should be noted that the polyvinyl alcohol is polyvinyl alcohol having a weight-average polymerization degree of 1,700 and a saponification degree of 98 to 99 mol %.

Comparative Example 1-2

A recorded matter was obtained in the same manner as in Example 1-1 except that the kind of the polyvinyl alcohol was changed to polyvinyl alcohol available under the trade name "PVA217" (manufactured by KURARAY CO., LTD.) It should be noted that the polyvinyl alcohol is polyvinyl alcohol having a weight-average polymerization degree of 1,700 and a saponification degree of 87 to 89 mol %.

Comparative Example 1-3

A recorded matter was obtained in the same manner as in Example 1-1 except that the kind of the polyvinyl alcohol was changed to polyvinyl alcohol available under the trade name "PVA403" (manufactured by KURARAY CO., LTD.) It should be noted that the polyvinyl alcohol is polyvinyl alcohol having a weight-average polymerization degree of 300 and a saponification degree of 78 to 82 mol %.

[Evaluation <Adhesive Strength>]

An adhesive strength between a transparent sheet and an ink-receiving layer was evaluated in conformity with a crosscut method described in JIS-K-5600-5-6. Specifically, first, a surface on the transparent sheet side of the recorded matter of each of Examples and Comparative Examples was provided with a 1-cm square lattice-shaped flaw by using a box cutter. Next, an adhesive tape (trade name: "Mending Tape," manufactured by Sumitomo 3M Limited) was attached to the portion provided with the flaw. Finally, the adhesive tape was released from the recording medium, and the extent to which the transparent sheet released was evaluated by the following criteria. Table 1 shows the result.
◯: The peeling of the transparent sheet is absent in a visual evaluation.
x: The peeling of the transparent sheet is present in a visual evaluation.

TABLE 1

| | Polyvinyl alcohol | | | |
| | Trade name | Weight-average polymerization degree | Saponification degree (mol %) | Evaluation Adhesive strength |
| --- | --- | --- | --- | --- |
| Example 1-1 | PVA235 | 3,500 | 87 to 89 | ◯ |
| Example 1-2 | PVA245 | 4,500 | 87 to 89 | ◯ |
| Example 1-3 | PVA424 | 2,400 | 87 to 89 | ◯ |
| Comparative Example 1-1 | PVA117 | 1,700 | 98 to 99 | x |
| Comparative Example 1-2 | PVA217 | 1,700 | 87 to 89 | x |
| Comparative Example 1-3 | PVA403 | 300 | 78 to 82 | x |

The recorded matter of each of Examples 1-1 to 1-3 in which the polyvinyl alcohol had a weight-average polymerization degree of 2,000 or more and 5,000 or less, and a saponification degree of 70 mol % or more and 90 mol % or less was free of the peeling of the transparent sheet and showed a high adhesive strength. In contrast, the recorded matter of each of Comparative Examples 1-1 to 1-3 in which the weight-average polymerization degree and saponification degree of the polyvinyl alcohol deviated from the ranges showed the following result: the peeling of the transparent sheet was present and the adhesive strength was insufficient.

Example 2-1

A recording medium including a gap-absorption-type ink-receiving layer was manufactured by the following method.

[Preparation of Hydrated Alumina Dispersion Liquid]

20 Parts of a hydrated alumina A having a boehmite structure (pseudoboehmite structure) (trade name: "Disperal HP14," manufactured by Sasol) were added to pure water, and 0.4 part of acetic acid was further added to perform a peptization process. Thus, a hydrated alumina dispersion liquid was obtained. The average particle diameter of hydrated alumina fine particles in the hydrated alumina dispersion liquid was 140 nm. Next, 0.3 part of boric acid was added to the dispersion liquid to provide a boric acid-added hydrated alumina dispersion liquid.

Preparation of Aqueous Solution of Polyvinyl Alcohol

Separately from the foregoing, polyvinyl alcohol (trade name: "PVA235," manufactured by KURARAY CO., LTD.) was dissolved in ion-exchanged water to prepare an aqueous solution of the polyvinyl alcohol having a solid content of 8 mass %. It should be noted that the polyvinyl alcohol had a weight-average polymerization degree of 3,500 and a saponification degree of 87 to 89 mol %.

[Preparation of Coating Liquid for Forming Ink-Receiving Layer]

100 Parts by mass of the boric acid-added hydrated alumina dispersion liquid and 27.8 parts by mass of the aqueous solution of the polyvinyl alcohol were mixed with a static mixer to provide a coating liquid for forming an ink-receiving layer.

[Manufacture of Recording Medium]

Immediately after the mixing, the coating liquid was applied onto a transparent sheet in a layered sheet of the transparent sheet, a releasing layer, and a base material sheet, and was dried to manufacture a recording medium including a gap-absorption-type ink-receiving layer. The coating liquid was applied with a die coater at an application speed of 5 m/minute so that a coating weight after the drying became 15 g/m$^2$. A drying temperature was set to 80° C. It should be noted that a sheet available under the trade name "DCR-320" (manufactured by DYNIC CORPORATION) was used as the layered sheet. The layered sheet had a thickness of 15 μm and a total luminous transmittance of 100%.

Example 2-2

A recording medium was obtained in the same manner as in Example 2-1 except that the kind of the hydrated alumina A was changed to a hydrated alumina available under the trade name "Disperal HP13." It should be noted that the average particle diameter of hydrated alumina fine particles in the hydrated alumina dispersion liquid obtained in Example 2-2 was 130 nm.

Example 2-3

A recording medium was obtained in the same manner as in Example 2-1 except that the kind of the hydrated alumina A was changed to a hydrated alumina available under the trade name "Disperal HP18." It should be noted that the average particle diameter of hydrated alumina fine particles in the hydrated alumina dispersion liquid obtained in Example 2-3 was 180 nm.

Comparative Example 2-1

A recording medium was obtained in the same manner as in Example 2-1 except that the kind of the hydrated alumina A was changed to a hydrated alumina available under the trade name "Disperal HP22." It should be noted that the average particle diameter of hydrated alumina fine particles in the hydrated alumina dispersion liquid obtained in Comparative Example 2-1 was 220 nm.

Comparative Example 2-2

An attempt was made to manufacture a recording medium in the same manner as in Example 2-1 except that the kind of the hydrated alumina A was changed to a hydrated alumina available under the trade name "Disperal HP30." However, the average particle diameter of fine particles in the hydrated alumina dispersion liquid obtained in Comparative Example 2-2 was 300 nm, and hence the hydrated alumina precipitated owing to the large particle diameter. Accordingly, a recording medium could not be manufactured, and hence evaluations for recording suitability (fixability) and visibility (color difference) could not be performed.

Comparative Example 2-3

A recording medium was obtained in the same manner as in Example 2-1 except that the kind of the hydrated alumina A was changed to a hydrated alumina available under the trade name "Disperal HP10." It should be noted that the average particle diameter of hydrated alumina fine particles in the hydrated alumina dispersion liquid obtained in Comparative Example 2-3 was 100 nm.

Comparative Example 2-4

An attempt was made to manufacture a recording medium in the same manner as in Example 2-1 except that the kind of the hydrated alumina A was changed to a hydrated alumina available under the trade name "Disperal HP8." However, the average particle diameter of hydrated alumina fine particles in the hydrated alumina dispersion liquid obtained in Comparative Example 2-4 was 80 nm, and hence the viscosity of the hydrated alumina dispersion liquid became too high owing to the small particle diameter. Accordingly, a recording medium could not be manufactured, and hence evaluations for recording suitability (fixability) and visibility (color difference) could not be performed.

[Evaluation <Dispersibility>]

Whether a 20.0 mass % coating liquid of a hydrated alumina had a viscosity proper for the preparation of a coating liquid (10 to 300 mPa·s (25° C.), E-type viscometer), and whether the hydrated alumina was uniformly dispersed when visually observed were evaluated by the following criteria. Table 2 shows the result.

○: The viscosity range is satisfied and the hydrated alumina is uniformly dispersed in a visual evaluation.

x: The viscosity range is not satisfied or the hydrated alumina precipitates in a visual evaluation.

[Evaluation <Recording Suitability (Fixability)>]

An image was recorded on the recording medium of each of Examples and Comparative Examples, and recording suitability (fixability) was evaluated. The recording was performed with a thermal inkjet recording apparatus (trade name: "LX-G5500," manufactured by CANON FINETECH INC.). In this case, the evaluation was performed with a magenta (M) ink alone having the worst fixability out of the inks to be used in the recording apparatus. Printing performed on the recording medium was such solid printing that an ink ejection density with respect to a unit area (1,200 dpi×1,200 dpi) ranged from 10% to 100% (in increments of 10%). Poor fixability occurs in the following forms: tailing caused by faulty fixation of the ink on a recording surface; and density nonuniformity caused by, for example, the application unevenness of the ink-receiving layer. The presence or absence of the tailing or the density nonuniformity was confirmed by visually observing the recording medium after the printing, and the recording suitability (fixability) was evaluated by the following criteria. Table 2 shows the result.

Evaluation Criteria (a Judgment is Performed Under Such a Condition that the Ratio of an Ink Coating Weight to the Unit Area is 40%.)

○: None of the image disturbances (the tailing and the nonuniformity) occurs.

Δ: One of the image disturbances occurs.

x: The image disturbances occur.

[Evaluation <Visibility (Color Difference)>]

Figure 7:
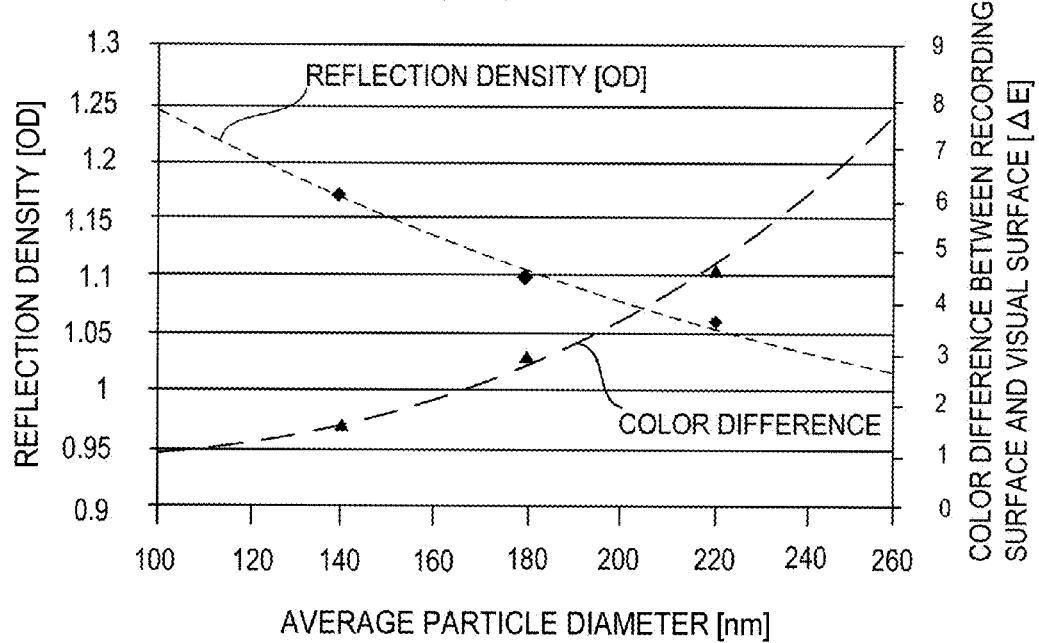
FIG. 7 is a graph showing a relationship between the average particle diameter of alumina fine particles, and each of a reflection density (OD), and a color difference (ΔE) between a recording surface and a visual surface.

An image was recorded on the recording medium of each of Examples and Comparative Examples, and visibility was evaluated. The recording on the recording medium was performed with a thermal inkjet recording apparatus (trade name: "LX-G5500," manufactured by CANON FINETECH INC.). As in the evaluation for recording suitability, an ink used was a magenta (M) ink alone, and the recording was performed by solid printing while an ink ejection density was set to 40%. The Lab colorimetric systems of a recording surface (surface on the ink-receiving layer side) and visual surface (surface on the transparent sheet side) in the recording medium were measured with a spectrophotometer (trade name: "Spectrolino," manufactured by GretagMacbeth), a color difference was calculated from the following equation (1), and the evaluation was performed by the following criteria. Table 1 and FIG. 7 show the result. FIG. 7 is a graph showing a relationship between the average particle diameter of alumina fine particles, and each of a reflection density (OD), and the color difference (ΔE) between the recording surface and the visual surface.

$$\Delta E^*ab = [(\Delta L^*)^2 + (\Delta a^*)^2 + (\Delta b^*)^2]^{1/2} \quad (1)$$

○: ΔE≤3 (Color developability and clearness are good, and hence it is difficult to feel the color difference between the recording surface and the visual surface.)

Δ: 3<ΔE≤5 x: 5<ΔE

TABLE 2

| | Alumina fine particles | | Evaluation | | |
|---|---|---|---|---|---|
| | Trade name | Average particle diameter (nm) | Dispersibility | Recording suitability | Visibility |
| Example 2-1 | HP-14 | 140 | ○ | ○ | ○ |
| Example 2-2 | HP-13 | 130 | ○ | Δ | ○ |
| Example 2-3 | HP-18 | 180 | ○ | ○ | Δ |
| Comparative Example 2-1 | HP-22 | 220 | ○ | ○ | x |
| Comparative Example 2-2 | HP-30 | 300 | x | — | — |
| Comparative Example 2-3 | HP-10 | 100 | ○ | x | ○ |
| Comparative Example 2-4 | HP-8 | 80 | x | — | — |

Each of Examples 2-1 to 2-3 in which the average particle diameter of the alumina dispersion liquid was 120 nm or more and 200 nm or less showed good results; specifically, each of the dispersibility, the recording suitability, and the visibility was evaluated as ○ or Δ. In contrast, each of Comparative Examples 2-1 to 2-4 in which the average particle diameter of the hydrated alumina was less than 120 nm or more than 200 nm showed unsatisfactory results; specifically, one of the dispersibility, the recording suitability, and the visibility was evaluated as x.

As compared with the thermal transfer system, the recording medium according to one embodiment of the present invention is capable of achieving an improvement in productivity of a recorded matter, an improvement in information security thereof, and a reduction in recording cost therefor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-167123, filed Aug. 9, 2013, No. 2013-189157, filed Sep. 12, 2013, No. 2013-228643, filed Nov. 1, 2013, No. 2013-228644, filed Nov. 1, 2013 and No. 2014-102115, filed May 16, 2014, which are hereby incorporated by reference herein in their entirety.

What is claimed is:

1. A transferring material, comprising:
an ink-receiving layer configured to receive an ink for inkjet recording;
a transparent sheet having a total luminous transmittance of 50% or more;
a releasing layer comprising a composition including a release agent; and
a base material sheet serving as a support for the releasing layer,
wherein the transferring material has a layered structure in which (i) the ink-receiving layer, the transparent sheet, the releasing layer, and the base material sheet are sequentially stacked, and (ii) the transparent sheet and the ink-receiving layer are in abutment with each other,
wherein the ink-receiving layer comprises a gap-absorption-type ink-receiving layer comprising a composition including alumina fine particles having an average particle diameter of 120 nm or more and 200 nm or less and polyvinyl alcohol having a weight-average polymerization degree of 2,000 or more and 5,000 or less and a saponification degree of 70 mol % or more and 90 mol % or less, wherein a content of the polyvinyl alcohol in the ink-receiving layer is 3.3 parts by mass or more and 100 parts by mass or less with respect to 100 parts by mass of the alumina fine particles, and wherein an image is recorded with a pigment ink comprising a resin dispersion-type pigment, and the transferring material is used for transferring the image onto a transfer member.

2. A transferring material according to claim 1, wherein the transparent sheet and the releasing layer are in abutment with each other, and the transferring material has the layered structure in which the releasing layer and the base material sheet are in abutment with each other.

3. A recorded matter comprising:

an image support on which an image is supported; and a transferring material as recited in claim 1 on which the image is recorded, wherein the recorded matter has a layered structure in which the image support, the ink-receiving layer, the transparent sheet, the releasing layer, and the base material sheet are sequentially stacked.

4. A recorded matter according to claim 3, wherein the base material sheet and the releasing layer are released, and a surface of the transparent sheet on which the ink-receiving layer is not stacked is exposed.

5. A recorded matter according to claim 3, wherein the image support further includes a primer layer, and wherein the recorded matter has the layered structure in which the image support, the primer layer, the ink-receiving layer, and the transparent sheet are sequentially stacked.

6. A recorded matter according to claim 5, wherein the image support and the primer layer are in abutment with each other, and wherein the recorded matter has the layered structure in which the primer layer and the ink-receiving layer are in abutment with each other.

7. A transferring material according to claim 1, wherein the resin dispersion-type pigment comprises pigment particles coated with a (meth)acrylate-based copolymer having an acid value of 100 mgKOH/g or more and 160 mgKOH/g or less.

8. A transferring material according to claim 1, wherein a coating weight after the ink-receiving layer is dried is 8 g/m$^2$ or more and 25 g/m$^2$ or less in terms of solid content.

9. A recorded matter comprising:

an image support on which an image is supported; and a transferring material as recited in claim 2 on which the image is recorded, wherein the recorded matter has a layered structure in which the image support, the ink-receiving layer, the transparent sheet, the releasing layer, and the base material sheet are sequentially stacked.

10. A recorded matter according to claim 9, wherein the base material sheet and the releasing layer are released, and a surface of the transparent sheet on which the ink-receiving layer is not stacked is exposed.

11. A recorded matter according to claim 9, wherein the image support further includes a primer layer, and wherein the recorded matter has the layered structure in which the image support, the primer layer, the ink-receiving layer, and the transparent sheet are sequentially stacked.

12. A recorded matter according to claim 11, wherein the image support and the primer layer are in abutment with each other, and wherein the recorded matter has the layered structure in which the primer layer and the ink-receiving layer are in abutment with each other.

13. A recorded matter comprising:

an image support on which an image is supported; and a transferring material as recited in claim 7 on which the image is recorded, wherein the recorded matter has a layered structure in which the image support, the ink-receiving layer, the transparent sheet, the releasing layer, and the base material sheet are sequentially stacked.

14. A recorded matter according to claim 13, wherein the base material sheet and the releasing layer are released, and a surface of the transparent sheet on which the ink-receiving layer is not stacked is exposed.

15. A recorded matter according to claim 13, wherein the image support further includes a primer layer, and wherein the recorded matter has the layered structure in which the image support, the primer layer, the ink-receiving layer, and the transparent sheet are sequentially stacked.

16. A recorded matter according to claim 15, wherein the image support and the primer layer are in abutment with each other, and wherein the recorded matter has the layered structure in which the primer layer and the ink-receiving layer are in abutment with each other.

17. A recorded matter comprising:

an image support on which an image is supported; and a transferring material as recited in claim 8 on which the image is recorded, wherein the recorded matter has a layered structure in which the image support, the ink-receiving layer, the transparent sheet, the releasing layer, and the base material sheet are sequentially stacked.

18. A recorded matter according to claim 17, wherein the base material sheet and the releasing layer are released, and a surface of the transparent sheet on which the ink-receiving layer is not stacked is exposed.

19. A recorded matter according to claim 17, wherein the image support further includes a primer layer, and wherein the recorded matter has the layered structure in which the image support, the primer layer, the ink-receiving layer, and the transparent sheet are sequentially stacked.

20. A recorded matter according to claim 19, wherein the image support and the primer layer are in abutment with each other, and wherein the recorded matter has the layered structure in which the primer layer and the ink-receiving layer are in abutment with each other.

* * * * *